US012380366B2

(12) United States Patent
Gettle et al.

(10) Patent No.: US 12,380,366 B2
(45) Date of Patent: Aug. 5, 2025

(54) AUTO-GENERATED FULFILLMENT ATTRIBUTES

(71) Applicant: Block, Inc., San Francisco, CA (US)

(72) Inventors: Krista Gettle, Oakland, CA (US); Richard Chung, Seattle, WA (US); Vaishnavi Thangapalam, Fremont, CA (US); Paola Mendoza, Gardena, CA (US); Randy Findley, Yardley, PA (US)

(73) Assignee: Block, Inc., Oakland, CA (US)

( * ) Notice: Subject to any disclaimer, the term of this patent is extended or adjusted under 35 U.S.C. 154(b) by 235 days.

(21) Appl. No.: 17/551,783

(22) Filed: Dec. 15, 2021

(65) Prior Publication Data
US 2023/0184579 A1 Jun. 15, 2023

(51) Int. Cl.
G06N 20/00 (2019.01)
G06Q 10/0834 (2023.01)
(Continued)

(52) U.S. Cl.
CPC ....... *G06N 20/00* (2019.01); *G06Q 10/08345* (2013.01); *G06Q 20/208* (2013.01); *G06V 10/46* (2022.01)

(58) Field of Classification Search
CPC .. G06Q 20/208; G06Q 50/28; G06Q 30/0611; G06Q 10/08345; G06Q 10/083;
(Continued)

(56) References Cited

U.S. PATENT DOCUMENTS 6,721,762 B1 * 4/2004 Levine ............... G06Q 10/08 707/999.102
10,268,892 B1 * 4/2019 Miller ............... G06F 1/1626
(Continued)

FOREIGN PATENT DOCUMENTS

WO WO-2018004444 A1 * 1/2018 ........... G06Q 10/047
WO WO-2018004445 A1 * 1/2018 ........... G06Q 10/047

OTHER PUBLICATIONS

Zhuowen Tu (Department of Statistics, UCLA), "Image Parsing: Unifying Segmentation, Detection, and Recognition," 2005, International Journal of Computer Vision 63(3), 113-140, 2005, (Year: 2005).*
(Continued)

Primary Examiner — Jeff Zimmerman
Assistant Examiner — Matthew Parker Goodman
(74) Attorney, Agent, or Firm — Lee & Hayes, P.C.

(57) ABSTRACT

Generating a fulfillment attribute(s) associated with an item (s) based on inputs associated with the item(s) is described. One or more inputs (e.g., images) of an item (packaged or unpackaged) can be analyzed, and characteristics associated with the item can be determined based on the analysis of the inputs. Upon receiving a user-specified delivery location, fulfillment attribute(s) can be determined based on the delivery location and the characteristics associated with the item, and the fulfillment attribute(s) can be displayed to a user. For example, a point-of-sale (POS) device can be used during a checkout process at a merchant location to capture an image(s) of an item, and to display a shipping quote for selection by a user based on the captured item imagery.

20 Claims, 9 Drawing Sheets

(51) Int. Cl.
*G06Q 20/20* (2012.01)
*G06V 10/46* (2022.01)

(58) Field of Classification Search
CPC ........... G06Q 30/0631; G06Q 30/0238; G06Q 30/0268; G06T 7/50; G06T 19/006
See application file for complete search history.

(56) References Cited

U.S. PATENT DOCUMENTS

| | | | |
|---|---|---|---|
| 11,379,788 B1* | 7/2022 | Wagner | G06F 3/0486 |
| 2013/0144763 A1 | 6/2013 | Skyberg et al. | |
| 2014/0201020 A1* | 7/2014 | Horowitz | G06Q 30/0284 |
| | | | 705/26.4 |
| 2014/0360141 A1* | 12/2014 | Willard, III | B65B 65/00 |
| | | | 53/507 |
| 2014/0379604 A1* | 12/2014 | Bodenhamer | G06Q 10/08345 |
| | | | 705/330 |
| 2017/0061376 A1* | 3/2017 | Wagner | G06Q 10/0838 |
| 2018/0374046 A1* | 12/2018 | Powers | G06Q 10/08345 |
| 2019/0355121 A1* | 11/2019 | Nelson | G06T 7/70 |
| 2019/0370721 A1* | 12/2019 | Issac | B07C 5/36 |
| 2020/0184667 A1* | 6/2020 | Miller | G06T 7/593 |
| 2020/0279208 A1* | 9/2020 | Kumar | G06V 10/245 |
| 2021/0012397 A1* | 1/2021 | Lu | G06T 7/62 |
| 2021/0116232 A1* | 4/2021 | Epshteyn | G01B 11/00 |
| 2021/0142390 A1* | 5/2021 | Abraham | G06N 20/00 |
| 2021/0192660 A1 | 6/2021 | Delgado et al. | |
| 2021/0233102 A1* | 7/2021 | DeDeo | G06Q 30/0211 |
| 2021/0262851 A1* | 8/2021 | Blankley, Jr. | G01G 19/4144 |
| 2021/0319399 A1* | 10/2021 | Mozzami | G06F 16/9537 |
| 2023/0098811 A1* | 3/2023 | Shevtsov | G06F 18/214 |
| | | | 705/16 |

OTHER PUBLICATIONS

Salazar, "Communicating Ecommerce Discounts and Promotions," Mar. 10, 2019, Nielsen Norman Group, https://www.nngroup.com/articles/cdiscounts/ (Year: 2019).*

International Search Report and Written Opinion for International Patent Application No. PCT/US2022/052881, mailed on Mar. 15, 2023.

* cited by examiner

AUTO-GENERATED FULFILLMENT ATTRIBUTES

TECHNICAL FIELD

Many merchants offer their items for sale in brick-and-mortar stores. Customers who are shopping for items in brick-and-mortar stores may be interested in having a purchased item shipped to a delivery location instead of taking the item out of the store with them. In these scenarios, the customer may ask a store clerk to tell them how much it would be to ship the item to a delivery location. In some cases, the customer may abandon the purchase altogether if the merchant is unable to ship the item or if the customer has to wait a long time for the store clerk to provide a shipping quote, and the merchant may lose a potential sale as a result.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
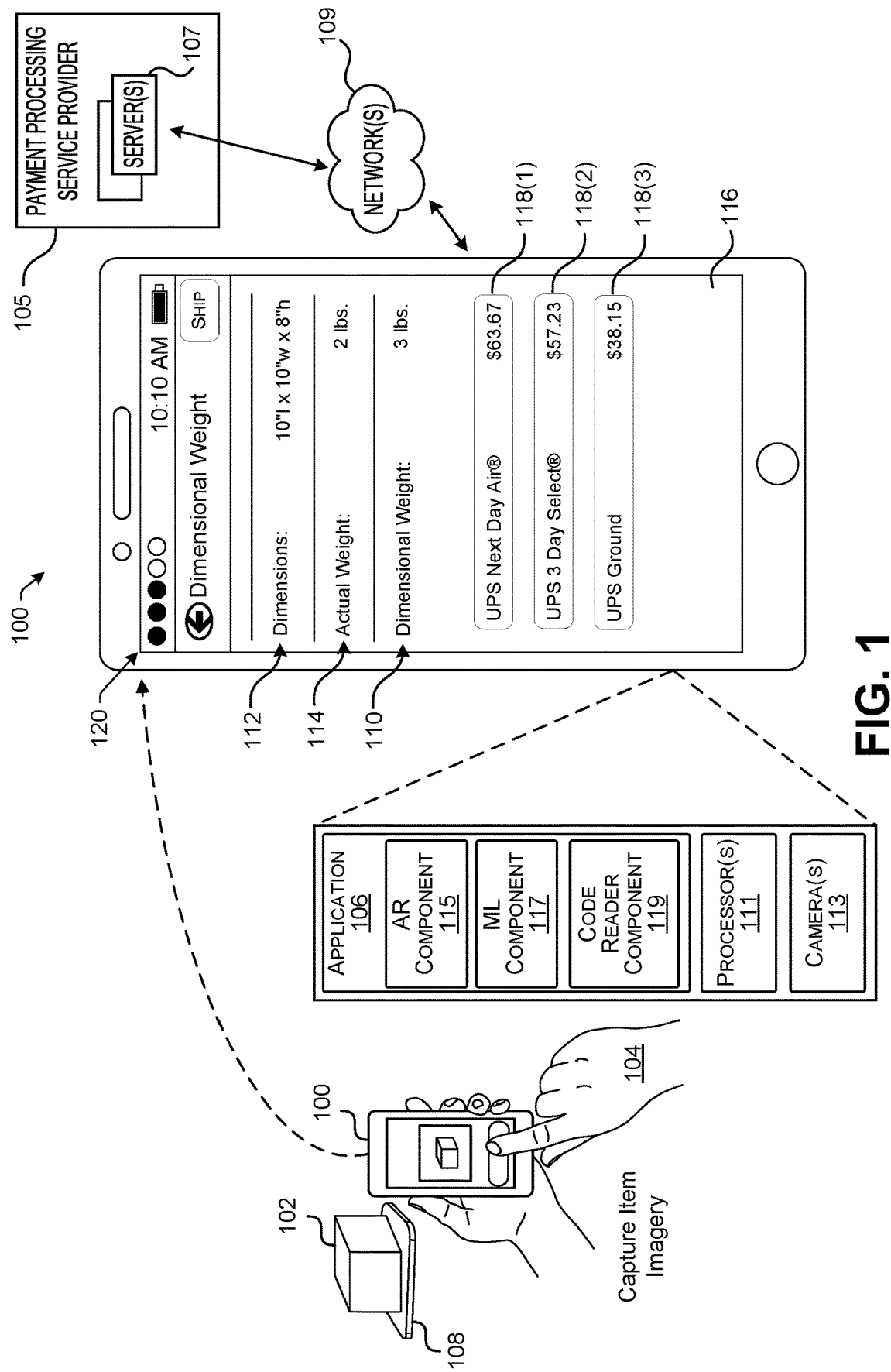
FIG. 1 is an example computing device configured to generate fulfillment attributes for an item, according to an implementation of the present subject matter.

Described herein are, among other things, techniques, devices, and systems for automatically generating fulfillment attributes for shipping an item by utilizing computer vision and image and video analysis techniques. In some aspects, machine learning models are utilized to further reduce the computer and networking resources when manually identifying the fulfillment attributes. In one example, the fulfillment attributes include a quote for shipping an item(s) to a delivery location(s) based on imagery or video of the item(s), one or more fulfillment channels to deliver the item, a specific fulfillment container to deliver the item, bundling options for network efficiency, and so on. For example, a system may receive (e.g., capture, using a camera) inputs of an item (e.g., an image of an item, audio-visual information related to an item, haptic inputs, etc.), and based on an analysis of the inputs, the system may determine item characteristics (e.g., dimensions of a package for delivering the item). The system may also determine item characteristics such as an actual weight of the item. In some examples, a dimensional (DIM) weight associated with the item may be determined based at least in part on the item characteristics. The DIM weight and/or the actual weight can then be applied to a predictive model to predict fulfillment attributes, e.g., a cost(s) of shipping the item to a delivery location using a delivery service of a particular fulfillment provider(s). In another example, the fulfillment attributes can be the type of packaging material used to package the item. For example, the system may determine the optimal packaging material and dimensions of packaging material that fits the dimensional characteristics of the item and is sufficient to protect the item during shipment (e.g., sufficient protection determined by previously successful shipments of substantially similar items within a threshold success metric). The cost(s) of shipping an item (or multiple items) to a delivery location using a delivery service(s) of one or more fulfillment providers is sometimes referred to herein as a "shipping quote" or a "quote for fulfilling delivery of the item." The system can present the fulfillment attributes, such as the shipping quote, on a display (e.g., customer's device, merchant's device, etc.) to inform a user(s) (e.g., a customer, a store clerk, etc.) about, for example, the cost(s) of shipping the item to the desired delivery location using one or more fulfillment channels. A "fulfillment channel," as used herein, may correspond to a delivery service provided by a fulfillment provider. Accordingly, a first fulfillment channel may represent a delivery service that guarantees delivery in within a particular number of days, hours, etc., while a second fulfillment channel may represent a standard (e.g., ground) delivery service. Additionally, or alternatively, a "fulfillment channel" may correspond to a fulfillment provider. Accordingly, a first fulfillment channel may represent UPS®, while a second fulfillment channel may represent FedEx®. Additionally, or alternatively, a "fulfillment channel" may correspond to a type of vehicle used to transport an item(s), such as a land vehicle, aerial vehicle, sea vessel, and/or a human courier that delivers the item by bicycle. A "fulfillment container," as used herein, may correspond to a package used to deliver the item from an origin to a destination/delivery location. Such fulfillment containers may vary and may include a box, a bag, or a cooler, to list a few examples. The type of packaging material used for the fulfillment container can also vary and may include options such as cardboard, metal, plastic, bubble wrap, foam, cloth, paper (e.g., tissue paper), and the like. In some examples, one or more selectable elements are presented on the display to allow a user to select an option to ship the item. In some examples, the system is a computing device, such as a point-of-sale (POS) device, usable to process transactions to purchase items in a store of a merchant, and the shipping quote can be displayed during a checkout process for a customer to purchase the item at a merchant location and to have the item shipped to a delivery location.

The techniques, devices, and systems described herein provide auto-generated fulfillment attributes that allow for, among other things, one or more devices to conserve resources with respect to processing resources, memory resources, networking resources, power resources, etc., in the various ways described herein. For example, fulfillment attributes, such as shipping quotes, that are automatically generated by a system (e.g., a computing device) using computer-analysis of item inputs (e.g., imagery) enables merchants to more-efficiently process transactions, such as by reducing the number of network transmissions made by a store clerk manually looking up various shipping rates from multiple fulfillment providers on the Internet, thereby reducing the computing and/or networking resources to generate a shipping quote. As such, techniques described herein offer improvements to existing technical environments.

In addition, the techniques, devices, and systems described herein may further allow streamlining a checkout process at a POS, and dynamically generating options by which an item can be fulfilled. This streamlined checkout process saves a merchant (e.g., a store clerk) time and energy by quickly generating fulfillment attributes (e.g., a quote for shipping an item) using a system (e.g., a computing device) to capture and analyze item inputs (e.g., an image of the item). In other words, the store clerk does not have to look for a package and a tape measure and measure the package with the tape measure. Nor does the store clerk have to navigate to webpages of multiple fulfillment providers in order to manually lookup costs of shipping an item to a delivery location on behalf of a customer. Rather, using the techniques, devices, and systems described herein, a computer-implemented algorithm is configured to generate and cause display of fulfillment attributes (e.g., a shipping quote for an item) based on analysis of item inputs (e.g., image analysis), which is much quicker than the above-described manual process involving a tape measure, etc. This can allow for greater flexibility in generating fulfillment attributes for items. For instance, a manager of a store can scan multiple items in quick succession, such as by scanning an entire shelf of items using a handheld computing device, to determine item characteristics in advance, which can increase the speed with which fulfillment attributes are generated once a delivery location(s) is/are specified.

In addition, the device-generated fulfillment attributes (e.g., shipping quote) described herein produces accurate fulfillment attributes (e.g., an accurate shipping quote) that is less prone to error, as compared to a store clerk's estimated fulfillment attributes (e.g., shipping quote) using an ad-hoc approach. This improved accuracy in the fulfillment attributes (e.g., shipping quote) may reduce, if not eliminate, instances where the customer is overcharged for shipping, or the merchant loses money based on an inaccurate shipping quote, etc. Some examples herein describe using augmented reality (AR) techniques to allow for a frictionless and more accurate determination of item characteristics (e.g., package dimensions), which allows for streamlined determination of fulfillment attributes.

In an illustrative example, a merchant offers items for purchase in a brick-and-mortar store. Consider an example where the items available for purchase in the store include, among other items, coffee mugs. A customer shopping in the store encounters a coffee mug he/she would like to ship to a friend, so the customer grabs the packaged coffee mug off of the store shelf, brings it to the checkout counter, and asks the cashier how much it would cost to ship the coffee mug to Chicago. The cashier places the packaged coffee mug (e.g., a box containing the coffee mug) on a scale that includes a wireless radio, and the cashier captures an image of the packaged coffee mug using a camera of a computing device with logic (e.g., an application) to generate shipping quotes for items. The computing device quickly determines a DIM weight of the packaged coffee mug using image analysis of the image captured by the cashier, and determines an actual weight of the packaged coffee mug from weight data that the computing device received wirelessly from the scale. The DIM weight can be determined using a computer enabled predictive model with a variable for the dimensions of a package for shipping the coffee mug. As described herein, the package dimensions that are entered into the predictive model for calculating DIM weight can be determined in various ways using image analysis. For example, a AR component can be used to analyze the image captured by the cashier and to determine the dimensions of the package containing the coffee mug. As another example, a machine learning model(s) can process the image captured by the cashier to generate a classification of the item, and the classification can be used to lookup the dimensions of a package for the coffee mug from a database. As yet another example, the image captured by the cashier can be analyzed to detect a machine-readable code in the image, and an identifier of the item determined from the machine-readable code can be used to lookup the dimensions of a package for the coffee mug from a database. Using the DIM weight, the actual weight, and a user-specified shipping address in Chicago, the computing device determines a cost of shipping the item to the shipping address in Chicago, and the computing device presents the shipping quote on a display. In this manner, the checkout process at the POS is streamlined, saving the merchant (e.g., the cashier) time and energy by quickly generating a quote for shipping the coffee mug using the computing device with logic to capture and analyze an image of the packaged coffee mug. In addition, the customer is pleased with the quick service provided by the cashier using the computing device, and both the customer and the merchant are happy to know that they were provided with an accurate, device-generated shipping quote that is usable at checkout to select an option for shipping the item.

While several examples presented herein are directed to using a computing device at a POS to generate fulfillment attributes (e.g., a shipping quote, packaging details, or other attributes) at a merchant location (e.g., a brick-and-mortar store), the techniques described herein are also applicable to generating fulfillment attributes in a customer return scenario and/or during an electronic commerce (e-commerce) transaction. In a customer returns example, a customer may install an application on his/her mobile phone and use the installed application to generate fulfillment attributes for an item that the customer would like to return to a merchant by shipping the item back to the merchant using a delivery service of a fulfillment provider. In an e-commerce example, a customer browsing items offered for sale on an electronic marketplace can have fulfillment attributes generated quickly and accurately based on item inputs (e.g., an image of the item that a seller posted to the electronic marketplace). For instance, the electronic marketplace may allow individual sellers to post items online for purchase, which may involve capturing their own images of items and posting the images via the electronic marketplace. In this example, a server computer(s) that implements the electronic marketplace is configured to analyze the image(s) of an item posted by a seller to determine a shipping quote for a customer and to present the shipping quote to the customer, such as during an online checkout process.

FIG. 1 is an example computing device configured to generate fulfillment attributes. For example, computing device 100 is configured to generate a quote for shipping an item 102 to a delivery location based on captured imagery of the item 102, as described herein. The computing device 100 is depicted as a mobile phone in FIG. 1, but it is to be appreciated that the computing device 100 can be any type of computing device. Additional details associated with the computing device 100 are described below with reference to FIGS. 8 and 9.

In at least one example, the computing device(s) 100 can be associated with a merchant. As used herein, a "merchant" can be any entity that offers items (e.g., products, goods, and/or services) for purchase or other means of acquisition (e.g., rent, borrow, barter, etc.). Such a merchant can offer items for purchase or other means of acquisition via brick-and-mortar stores, mobile stores (e.g., pop-up shops, food trucks, etc.), online stores ("e-commerce"), combinations of the foregoing, and so forth. In the non-limiting example illustrated in FIG. 1, consider a scenario where a merchant offers the item 102 for sale in a brick-and-mortar store. The store may be a "show-room" where items are on display for customers to view, touch/feel, and/or try out (e.g., don, such as an article of clothing). If the customer desires to purchase an item in the show-room, the customer may have it shipped to a desired delivery location. In other examples, customers may have the option of taking some purchased items out of the store with them, in addition to the option of shipping the remaining items to a user-defined or system-generated delivery location.

In some examples, a user 104, such as a store clerk (e.g., cashier, attendant, manager, etc.), may carry the computing device 100 with them throughout the store, and/or the user 104 may use the computing device 100 as a POS device to process transactions for items that customers purchase in the store. Accordingly, in at least one example, the computing device 100 can be associated with a payment processing service provider 105. In this example, the merchant may purchase, rent, or lease the computing device 100 from the payment processing service provider 105 to use in the merchant's store as a POS device. In an illustrative example, a user uses the computing device 100 at a checkout counter to process transactions for customers to purchase items in the store. In other examples, the computing device 100 can be a separate device that is not used as a POS device during a checkout process. In these other examples, a user may carry the computing device 100 with them around the store so that they can, among other things, provide shipping quotes for customers inquiring about shipping items using a delivery service(s) of a fulfillment provider.

The payment processing service provider 105 may operate a computing platform having one or more processing devices, such as one or more servers 107, among other devices. The computing platform (e.g., server(s) 107) operated by the payment processing service provider 105 may be communicatively coupled to the computing device 100 (and to other computing devices) over a network(s) 109. Additional details associated with the computing platform (e.g., server(s) 107) operated by the payment processing service provider 105 and the network(s) 109 for communicatively coupling the computing device 100 to such a computing platform are described below with reference to FIGS. 8 and 9.

In some examples, the computing device 100 may include an application 106 that is executable by one or more processors 111 of the computing device 100 to perform the various acts and/or processes disclosed herein. Further, the application 106 may be serviced by the payment processing service provider 105. In some examples, the payment processing service provider 105 supplies the computing device 100 to the merchant with the application 106 pre-installed on the computing device 100. In other examples, the merchant can download the application 106 from an "app store" or from a server computer associated with the payment processing service provider 105. The application 106 can be updated periodically, such as through software updates that are pushed to the computing device 100 over a wide-area network (e.g., the Internet, a cellular network, etc.). In an example, the user 104 can launch the application 106 by selecting an icon on a home screen of the computing device 100. Once the application 106 is launched, the application 106 is executed by one or more processors 111 of the computing device 100 to, among other things, present various interactive user interfaces for the user 104 to interact with to generate a shipping quote for a customer.

In an illustrative example, a customer who is shopping within the merchant's store finds the item 102 depicted in FIG. 1 and decides to purchase the item 102. The item 102 in FIG. 1 is depicted as a packaged item, meaning that it is contained within a package (e.g., a box, such as a cardboard box) that is suitable for shipping the item 102 using a fulfillment provider. The customer may bring the packaged item 102 to a checkout counter where the user 104 (e.g., a cashier) is available to assist the customer with purchasing the item 102 using the computing device 100. The cashier places the item 102 on a scale 108 at the checkout counter, opens the application 106 on the computing device 100 (if the application 106 is not already open), points a camera(s) 113 of the computing device 100 at the item 102, which is resting on the scale 108, and takes a picture of the item 102 via the application 106. It is to be appreciated that an actual weight of the item 102 may have been obtained and recorded in a database in association with an identifier of the item 102 (e.g., a stock keeping unit (SKU)) at an earlier time. In this example where the actual weight of the item is obtained and recorded at an earlier time, the item 102 would not have to be weighed using a scale 108 at the checkout counter. Instead, the actual weight of the item 102 may be retrieved from a database using an item identifier. A processor(s) 111 executing the application 106 analyzes the captured image of the item 102 to determine a DIM weight 110 of the packaged item 102, as described herein. It is to be appreciated that image analysis can be performed by an external computing device(s) separate from the computing device 100, such as an external computing device collocated at the merchant location, a remote server in "the cloud" (e.g., the server(s) 107), or the like. In these examples, the computing device 100 may send (e.g., via the network 109), the captured image of the item 102 to an external computing device for image analysis by the external computing device(s). In some examples, the processor 111 determines item characteristics, such as dimensions 112 of the packaged item 102, such as a length, a width, and a height, based on an analysis of the captured image. Accordingly, the DIM weight 110 may be calculated based on the item characteristics (e.g., the dimensions 112) and optionally, a DIM factor specific to a fulfillment provider. Example fulfillment providers (sometimes referred to herein as "carriers") include, without limitation, United Parcel Service (UPS®), FedEx®, etc., and each fulfillment provider may define its own DIM factor that is used to calculate DIM weight 110. An example formula for calculating the DIM weight 110 of an item 102 is $$\frac{L \times W \times H}{DIM \text{ Factor}},$$

where L is the length of the package containing the item 102, W is the width of the package containing the item 102, H is the height of the package containing the item, and the DIM factor is a fulfillment provider-specific DIM factor. In an example where a packaged item is contained in a cuboidal box measuring 10 inches in every direction, and using a fulfillment provider-specific DIM factor of 166, the DIM weight 110 is calculated as $$\frac{10 \times 10 \times 10}{166} = 6.02,$$

which is often rounded up to arrive at a DIM weight of 7 pounds (lbs.).

The computing device 100 may also determine item characteristics such as an actual weight 114 of the item 102. In some examples, the scale 108 may be wirelessly enabled (e.g., a Bluetooth® scale, WiFi scale, etc.), and the scale 108 may be used to weigh the item 102 and wirelessly transmit data to paired computing devices, such as the computing device 100. For example, weight data transmitted by the scale 108 may be received via a wireless transceiver of the computing device 100. It is to be appreciated that weight data can be received via non-wireless means, such as via a wire (e.g., a cable, such as a Universal Serial Bus (USB) cable), a storage device (e.g., a thumb drive), and the like. In other examples, the user 104 may capture an image of the readout on the scale's 108 display, or the user 104 may input the actual weight 114 manually (e.g., by typing, speaking, etc.) via the application 106. In yet another example, the weight may be determined based on visual metrics and comparison to similar items.

With the DIM weight 110 and the actual weight 114 determined, and with a delivery location specified by the customer or the cashier, the computing device 100 may determine one or more fulfillment attributes (e.g., a cost of shipping the item 102 to the delivery location using at least one delivery service of at least one fulfillment provider), and may present the fulfillment attribute(s) (e.g., the cost) on the display 116 of the computing device 100 via the application 106. In the example of FIG. 1, the computing device 100 is shown as presenting three selectable elements 118(1), 118(2), and 118(3) via a user interface 120, each selectable element 118 indicating a cost of shipping the item 102 to the delivery location using a respective delivery service of a fulfillment provider. For example, the first selectable element 118(1) indicates a cost of $63.67 to ship the item 102 using UPS Next Day Air® delivery service, the second selectable element 118(2) indicates a cost of $57.23 to ship the item 102 using UPS 3 Day Select® delivery service, and the third selectable element 118(3) indicates a cost of $38.15 to ship the item 102 using UPS Ground delivery service. In this way, the customer is informed as to the cost of shipping the item 102 using various delivery services, and the customer or the cashier can select the delivery service that the customer would like to use to ship the item 102, such as by providing touch input to the touch-sensitive display 116 of the computing device 100 to select one of the selectable elements 118. In some examples, the processor(s) 111 of the computing device 100 may cause fulfillment attributes (e.g., the cost of shipping the item 102, such as the selectable elements 118(1), 118(2), and 118(3)) to be presented on a display of a customer-owned device, such as a mobile phone of the customer. For example, the mobile phone of the customer may be wirelessly coupled (e.g., via a short-range wireless transceiver, such as a Bluetooth radio) to the computing device 100, and/or the mobile phone of the customer may have the application 106 installed thereon to receive content for display via the application 106 executing on the mobile phone of the customer. In these examples, the user 104 (e.g., a cashier) may provide user input to the application 106 executing on the computing device 100 to cause content displayed on the display 116 of the computing device to be "cast" to the customer's mobile phone and displayed thereon. In this way, the customer can readily view the fulfillment attributes and interact with one or more of the fulfillment attributes (e.g., select one of the selectable elements 118(1), 118(2), and 118(3)) on the display of the mobile phone of the customer to complete a step of the checkout process. In the example of FIG. 1, the displayed selectable elements 118 may constitute fulfillment attributes (e.g., the shipping quote) for the item 102. That is, the fulfillment attributes (e.g., shipping quote) may potentially include multiple different fulfillment attributes (e.g., costs of shipping the item 102 to a delivery location). It is to be appreciated that these multiple different fulfillment attributes (e.g., costs) may be associated with a single fulfillment provider, such as UPS, FedEx, or the like. It is also to be appreciated that multiple different fulfillment attributes (e.g., costs) may be associated with multiple different fulfillment providers, such as a first cost associated with a first fulfillment provider, a second cost associated with a second fulfillment provider, and so on. It is also to be appreciated that a shipping quote may include a single cost associated with a single delivery service provided by a single fulfillment provider, such as in a scenario where shipping options are limited and the customer may not have more than a single option for shipping the item 102.

In some examples, a trained machine learning model(s) can be used to predict fulfillment attributes (e.g., a quote for fulfilling delivery of the item 102, a fulfillment channel, a fulfillment container, a type of packaging material, one or more bundling options to fulfill the delivery of the item 102, etc.). For example, a trained machine learning model(s) can determine a bundling option to bundle the item 102 with orders of other customers and/or orders of the same customer. In an illustrative example, the customer who is ordering the item 102 and/or one or more other customers may have shopped at other merchants (e.g., other merchants on the same street as the merchant selling the item 102), and the computing device 100 may use a trained machine learning model(s) to predict the best (lowest price, fastest delivery, etc.) bundling option for the customer. In at least one example, data can be trained via a machine learning mechanism. In such an example, the model (e.g., machine learning model(s)) can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model can be trained on training data associated with a plurality of merchants. As output, the model may identify a fulfillment attribute(s) for display on the computing device 100.

Figure 2:
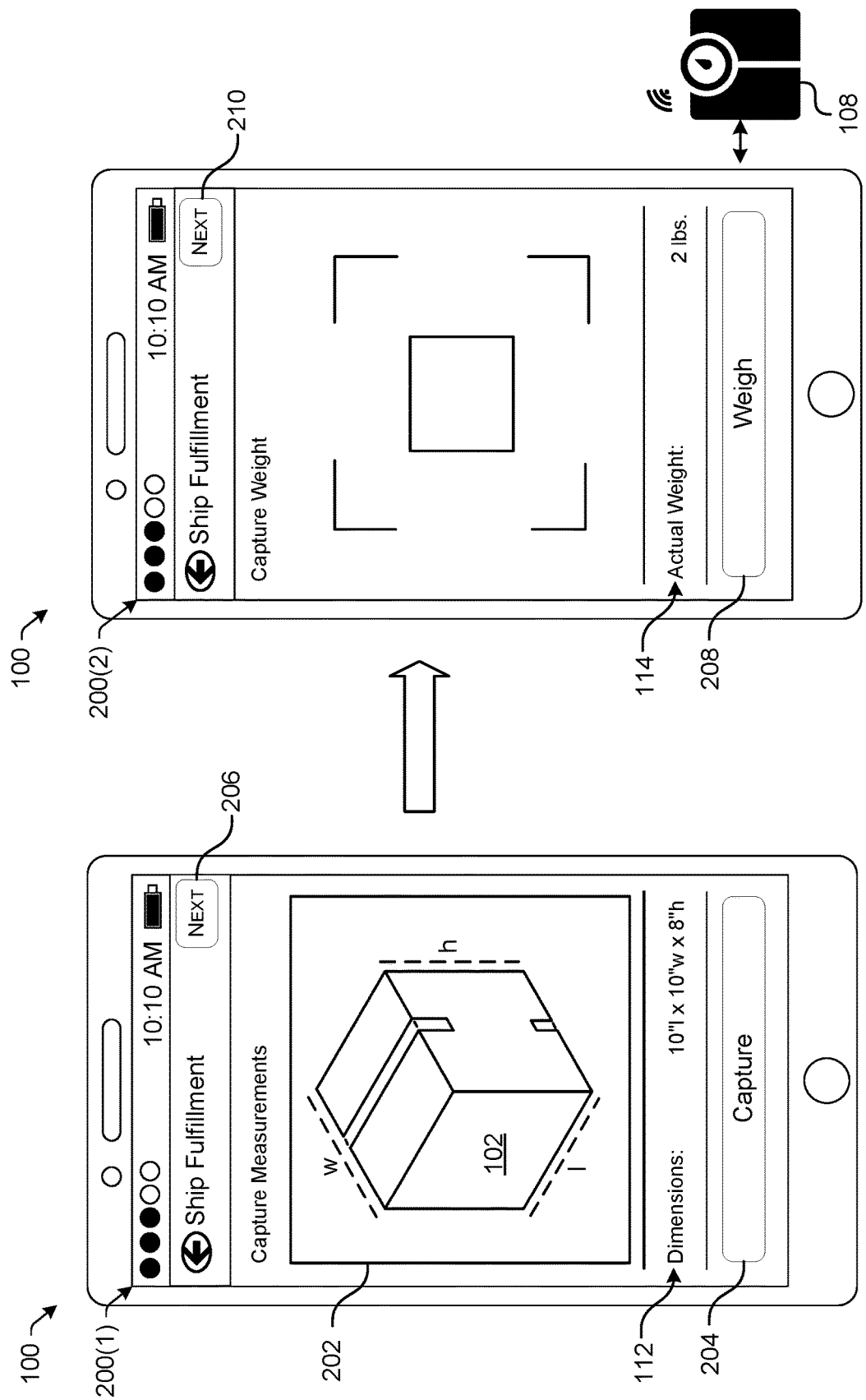
FIG. 2 are example user interfaces and techniques for capturing item characteristics, according to an implementation of the present subject matter.

FIG. 2 are example user interfaces 200 and techniques for capturing item characteristics, such as the dimensions 112 and the actual weight 114 of a packaged item 102, as described herein. In the example of FIG. 2, the user interface 200(1) may be presented on the display 116 of the computing device 100 when the user 104 opens the application 106 to generate a shipping quote for the item 102, or at any suitable time. In some examples, the user 104 arrives at the user interface 200(1) after navigating through one or more other user interfaces (not shown in FIG. 2), such as a ship fulfillment user interface where the user 104 selects an option to calculate a new shipping quote for an item. The user interface 200(1) includes a viewport 202 (or window) that presents image content (e.g., a still image, a live video, etc.) captured by the camera 113 of the computing device 100. In some examples, the viewport 202 presents a live video feed of what the camera 113 of the computing device 100 sees within the field of view of the camera 113. Accordingly, the user 104 may be able to move the computing device 100 around the item 102 and the image content within the viewport 202 updates in real-time or near real-time to present the views captured by the camera 113 of the computing device 100. In this way, the user 104 can move the computing device 100 to capture imagery of the item 102 from any suitable viewing angle. The user interface 200(1) may present the words "capture measurements" to indicate to the user 104 that the current step of the process is to determine the dimensions 112 of the packaged item 102, the dimensions including a length (l), width (w), and height (h), of the package containing the item 102.

In some examples, the user 104 may provide user input via the application 106 to cause the camera 113 of the computing device 100 to capture an image of the item 102. For example, the user 104 may select a selectable element 204 (e.g., a "capture" button) presented on the display 116 to cause the camera 113 of the computing device 100 to capture a still image(s) or a video of the item 102. The display 116 may be touch-sensitive to detect such user input. In some examples, the application 106 may utilize an AR component 115 to leverage a variety of techniques to determine an orientation and/or position of the item 102 in relation to the physical surroundings 108 of the device. The AR component 115 can analyze the image of the item 102 captured by the camera 113 of the computing device 100 and determine the dimensions 112 based on image analysis. For example, when the user points the camera 113 of the computing device 100 at the packaged item 102, a live, pass-through video feed may be automatically presented within the viewport 202, and the user 104 may provide user input by sequentially touching the display 116 within the viewport 202 at locations that correspond to visible corners of the packaged item 102. For example, when the user 104 touches the display 116 within the viewport 202 at a location near a corner of the packaged item 102, the AR component 115 may lock an icon (e.g., a small dot) onto the corner of the packaged item 102 that is closest to the location touched by the user 104. The user 104 can then touch the display 116 within the viewport 202 at a second location near another corner, at a third location near another corner, and so on to cause the AR component 115 to lock additional icons onto the additional corners of the packaged item 102 in a similar manner. In this way, the AR component 115 can detect the boundary of the packaged item 102 to determine the dimensions 112 in terms of a length (l), a width (w), and a height (h) of the package. For packages that are not cuboidal or perfectly cuboidal, the AR component 115 may be configured to detect a longest dimension in each Cartesian coordinate direction (X, Y, and Z). During this process of detecting the boundary of the packaged item 102, the user 104 can move the computing device 100 around the packaged item 102, and while the computing device 100 is moved, any icons presented within the viewport 202 may remain locked onto a corresponding corner of the packaged item 102 until the user 104 is finished touching the display 116 within the viewport 202 near the corners of the packaged item 102. In other examples, the AR component 115 automatically determines the corners of the packaged item 102 without assistance from the user 104 (e.g., without the user 104 providing user input). Once the dimensions 112 are determined, the user 104 can select a "next" element 206 to navigate to a next user interface, such as the user interface 200(2) depicted in FIG. 2.

In some examples, a user 104 may initially capture an image of the item 102, and based on analysis of the image, the computing device 100 (e.g., via the application 106) may request the user 104 to take a video of the item so that the AR component 115 can analyze video. For example, upon capturing an initial image of the item 102, the application 106 may present, on the display 116, a request for the user 104 to capture a video of the item (e.g., a pop-up notification that reads "Please take a video of the item to determine item characteristics." Upon seeing this request, the user may capture, and the AR component 115 may receive, video of the item. The AR component 115 may then analyze the video to determine dimensions 112 of a package containing the item, which may be used to determine the DIM weight 110 associated with the item, as described herein. In this way, the determination of item characteristics (e.g., dimensions 112), and ultimately a fulfillment attribute(s) (e.g., a shipping quote) can be determined with greater accuracy using video in some cases where a still image of the item 102 does not provide enough information to determine the item characteristics.

In the example of FIG. 2, the user interface 200(2) may be presented on the display 116 of the computing device 100 after the user 104 selects the "next" element 206 while the user interface 200(1) is presented, which is implied by the rightward-pointing arrow in FIG. 2. Alternatively, the user interface 200(2) can be presented at any other suitable time, such as prior to presenting the user interface 200(1). The user interface 200(2) is presented for determining the actual weight 114 of the item 102. The user interface 200(2) may present the words "capture weight" to indicate to the user 104 that the current step of the process is to determine the actual weight 114 of the item 102. The example of FIG. 2 depicts the scale 108 that was introduced in FIG. 1. The scale 108 can be wirelessly enabled (e.g., equipped with a wireless radio, such as a Bluetooth® radio, WiFi radio, etc.) to transmit weight data to the computing device 100. The weight data may be broadcast for a wireless transceiver of the computing device 100 to receive the broadcasted weight data, or the scale 108 may transmit the weight data to the computing device 100 upon a request from the computing device 100. For example, the user 104 may provide user input via the application 106 by selecting a selectable element 208 (e.g., a "weigh" button) on the user interface 200(2), which causes the computing device 100 to send a request to the scale 108 to transmit weight data indicating an actual weight 114 of whatever the scale 108 is currently weighing. Accordingly, if the user 104 places the item 102 on the scale 108, and then selects the selectable element 208, the computing device 100 may receive weight data from the scale 108 via a wireless transceiver of the computing device 100, and this weight data is indicative of the actual weight 114 of the item 102 being weighed by the scale 108. Once the actual weight 114 is determined, the user 104 can select a "next" element 210 to navigate to a next user interface, such as the user interface 120 of FIG. 1, where the application 106 presents the DIM weight 110, the actual weight 114, and a device-generated shipping quote (e.g., one or more selectable elements 118 indicating the cost(s) of shipping the item 102 to a delivery location using a delivery service(s) of a fulfillment provider(s)). This presumes that a user (e.g., the user 104) has provided user input via the application 106 that specifies the delivery location where the item 102 is to be shipped, because the shipping quote is at least partly based on the delivery location (e.g., relative to an origin location). In other words, the distance that a fulfillment provider has to travel to deliver the item 102 to the delivery location may be a factor in the calculated shipping quote.

In some examples, a user 104 may capture multiple images of multiple items, and the system (e.g., the computing device 100) may determine a fulfillment attribute(s) for fulfilling delivery of the multiple items in a single fulfillment container. That is, the computing device 100 may receive a first image of a first item and a second image of a second item, as well as a first actual weight of the first item and a second actual weight of the second item. Based on analyzing the first image and the second image, the system (e.g., computing device 100) may determine a DIM weight 110 of a package that is to contain the bundle of items that includes both the first item and the second item (e.g., a package that is large enough to contain both the first item and the second item). If the items are cuboidal in shape, this may involve adding the determined dimensions 112 in each Cartesian coordinate direction (X, Y, and Z) when the items are placed in a side-by-side arrangement or a stacked arrangement. In other cases where the items are more complex shapes, a packing algorithm may determine an optimal arrangement of the items by rotating virtual representations of the items in virtual space to arrive at an arrangement of the bundle that minimizes the volume, and the dimensions 112 of the optimized arrangement may be determined. It is to be appreciated that more than two items can be bundled in this way such that fulfillment attributes can be determined automatically based on images of any suitable number of items. In addition, the algorithm may cap bundling at a particular number of items based on overall volume of the arranged items meeting or exceeding a threshold volume. That is, available packages may vary in size, but there may be a largest-sized package available such that the number of items that can be bundled together in a single fulfillment container may be limited.

Figure 3:
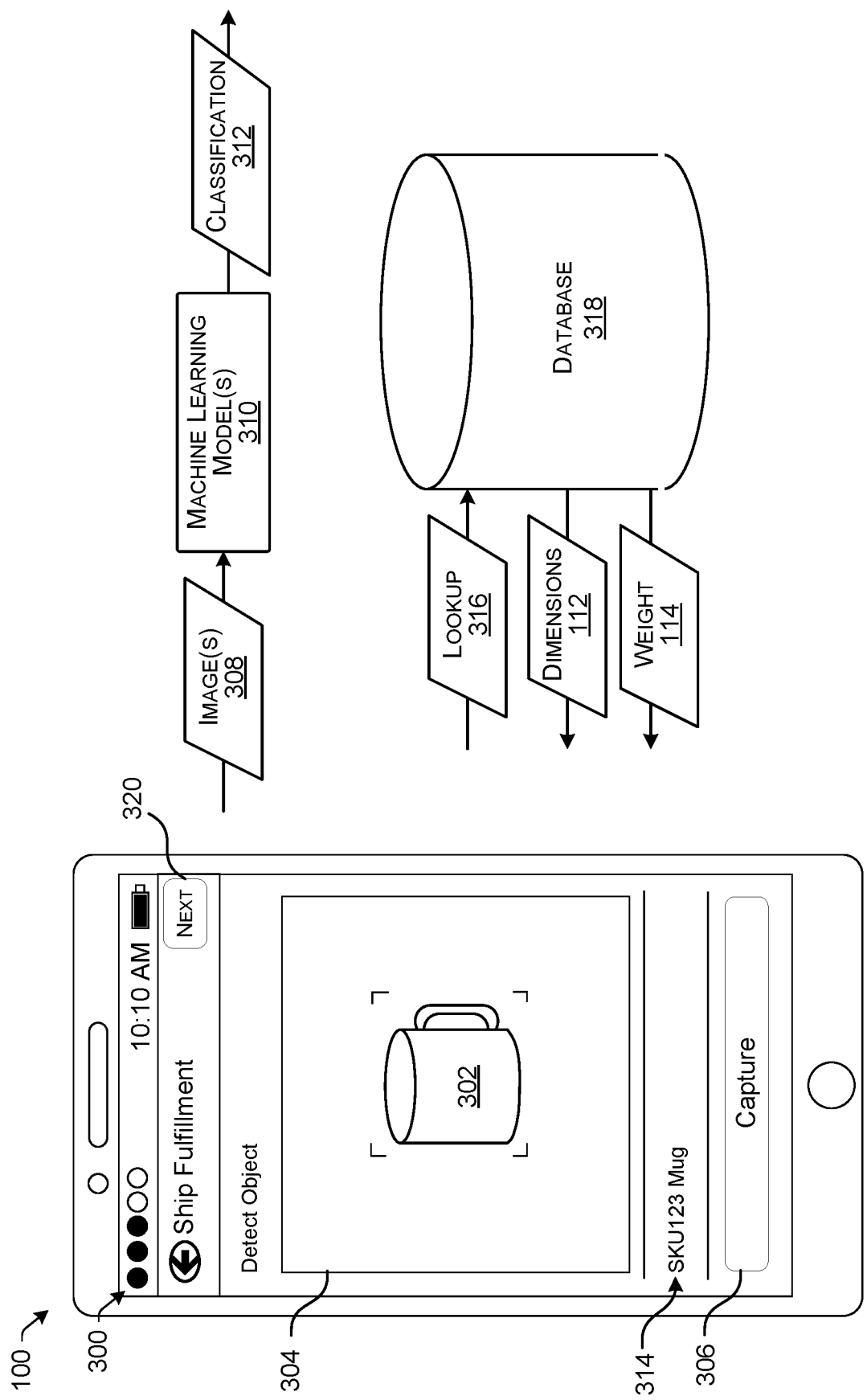
FIG. 3 is an example user interface and a technique for determining the item characteristics of an unpackaged item, according to an implementation of the present subject matter.

FIG. 3 is an example user interface 300 and a technique for determining the item characteristics of an unpackaged item, such as the dimensions 112 and/or the actual weight 114 of an unpackaged item 302, as described herein. In the example of FIG. 3, the user interface 300 may be presented on the display 116 of the computing device 100 when the user 104 opens the application 106 to generate a shipping quote for the item 302, or at any suitable time. In some examples, the user 104 arrives at the user interface 300 after navigating through one or more user interfaces (not shown in FIG. 3), such as a ship fulfillment user interface where the user 104 selects an option to calculate a new shipping quote for an item. The user interface 300 includes a viewport 304 (or window) that presents image content (e.g., a still image, a live video, etc.) captured by the camera 113 of the computing device 100. In some examples, the viewport 304 presents a live video feed of what the camera 113 of the computing device 100 sees within the field of view of the camera 113. Accordingly, the user 104 may be able to move the computing device 100 around the item 302 and the image content within the viewport 304 updates in real-time to present the views captured by the camera 113 of the computing device 100. In this way, the user 104 can move the computing device 100 to capture imagery of the item 302 from any suitable viewing angle. The user interface 300 may present the words "detect object" to indicate to the user 104 that the current step of the process is to determine the type of item 302 so that the dimensions 112 and/or an actual weight 114 of the item 302 can be determined by the computing device 100.

In some examples, the user 104 may provide user input via the application 106 to cause the camera 113 of the computing device 100 to capture an image of the item 302. For example, the user 104 may select a selectable element 306 (e.g., a "capture" button) presented on the display 116 to cause the camera 113 of the computing device 100 to capture image data 308 (e.g., a still image(s) or a video) of the item 302. In other examples, an image or a video may be captured automatically without user input, such as by the user 104 pointing the camera 113 of the computing device 100 at the item 302. In the example of FIG. 3, the image(s) 308 may be analyzed using machine learning and/or artificial intelligence (a machine learning component 117) to determine the dimensions 112 of a package that is to contain the item 302 and/or to determine an actual weight 114 of the item 302. That is, the image(s) 308 may be provided as input to a machine learning model(s) 310, and the machine learning model(s) 310 may generate a classification 312 of the item 302 as output.

Machine learning generally involves processing a set of examples (called "training data") in order to train a machine learning model(s). A machine learning model(s) 310, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the present disclosure, the unknown input may include an image(s) 308 (or image data), and the trained machine learning model(s) 310 may be tasked with outputting an item classification 312. In some examples, the classification 312 can include a score that indicates, or otherwise relates to, a probability of the image(s) 308 being classified in one of multiple classes indicative of a type of item. For instance, the score that is generated as output from the trained machine learning model(s) 310 may relate to a probability that the image(s) 308 is an item of a particular type or class. In some embodiments, the score output from the trained machine learning model(s) 310 is a variable that is normalized in the range of [0,1]. The score that is generated as output from the trained machine learning model(s) 310 can indicate a level of confidence that the item 302 depicted in the image(s) 308 is of a particular class of items.

The trained machine learning model(s) 310 may represent a single model or an ensemble of base-level machine learning models, and may be implemented as any type of machine learning model. For example, suitable machine learning models 310 for use by the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models 310 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The machine learning model(s) 310 can be trained using any suitable training data. In some examples, the training data includes a sampled subset of images of items generally found in product catalogues from a variety of merchants, and/or the training data can include a sampled subset of images from a particular merchant's item catalogue. In this manner, the machine learning model(s) 310 can be trained to recognize items generally, and/or to recognize items of a particular merchant's inventory. In general, training data for machine learning can include two components: features and labels. However, the training data used to train the machine learning model(s) 310 may be unlabeled, in some embodiments. Accordingly, the machine learning model(s) 310 may be trainable using any suitable learning technique, such as supervised learning, unsupervised learning, semi-supervised learning, reinforcement learning, and so on. The features included in the training data can be represented by a set of features, such as an n-dimensional feature vector of quantifiable information about an attribute of the training data. Example features included in the training data may include any suitable quantifiable characteristic or attribute of image data. As part of the training process, weights may be set for machine learning. These weights may apply to a set of features included in the training data. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the probability that is output by the trained machine learning model 310.

In the example of FIG. 3, the machine learning model(s) 310 may output a classification 312 that classifies the image(s) 308 of the item 302 as a coffee mug. In this example, the classification 312 can be output as "coffee mug" and/or as an item identifier (ID) 314 (e.g., SKU123 mug), possibly with a score that indicates, or otherwise relates to, a probability of the image(s) 308 being classified as a coffee mug, as mentioned above. This may be due to the fact that the machine learning model(s) 310 is trained to recognize items of a particular merchant's item catalogue, and is therefore able to classify the coffee mug with a particular item ID 314. The classification 312 and/or item ID 314 may be used in a lookup operation 316 to a database 318 in order to determine dimensions 112 and/or an actual weight 114 associated with the item 302. For example, a merchant may have previously weighed items in its inventory and measured the dimensions of packages used to ship those items and recorded the dimensions 112 and/or the actual weights 114 in the database 318. Accordingly, the database 318 may map items to dimensions 112 and/or actual weights 114, and the computing device 100 may access the database 318 to lookup 316 the dimensions 112 and/or the actual weight 114 associated a particular item, such as the coffee mug (item 302) identified by the machine learning model(s) 310 in the example of FIG. 3. If the machine learning model(s) is not able to identify the dimensions 112 or actual weight 114 to a minimum threshold probability (i.e. a pre-configured minimum weight value), the application 106 may present a user interface requesting a manually inputted value. The updated dimensions 112 or actual weight 114 can be used to further refine the machine learning model(s) 310. It is to be appreciated other item characteristics may be retrieved from the database 318 in addition to the dimensions 112 and/or actual weight 114, or alternatively to retrieving the dimensions 112 and/or actual weight 114. For example, the database 318 may store item characteristics including a fragility indicator (e.g., fragile, not fragile) to indicate how fragile the item 302 is, a perishability indicator (e.g., perishable, not perishable) to indicate whether the item 302 is perishable and/or an expiration date associated with the item 302, a temperature indicator (e.g., frozen, cold, etc.) to indicate whether the item 302 is to be kept below or above a threshold temperature during transit, and/or other item characteristics. In some examples, one or more of the item characteristics (e.g., package dimensions 112, etc.) maintained in the database 318 can be based on how other merchants fulfill deliveries of the same item 302 or similarly situated items (e.g., coffee mugs). Once the item characteristics (e.g., dimensions 112 and/or the actual weight 114) is/are determined, the user 104 can select a "next" element 320 to navigate to a next user interface, such as the user interface 120 of FIG. 1, where the application 106 presents the DIM weight 110, the actual weight 114, and a device-generated shipping quote (e.g., one or more selectable elements 118 indicating the cost(s) of shipping the item 302 to a delivery location using a delivery service(s) of a fulfillment provider(s)). Again, this presumes that a user (e.g., the user 104) has provided user input via the application 106 that specifies the delivery location where the item 302 is to be shipped, because the shipping quote is at least partly based on the delivery location (e.g., relative to an origin location).

Figure 4:
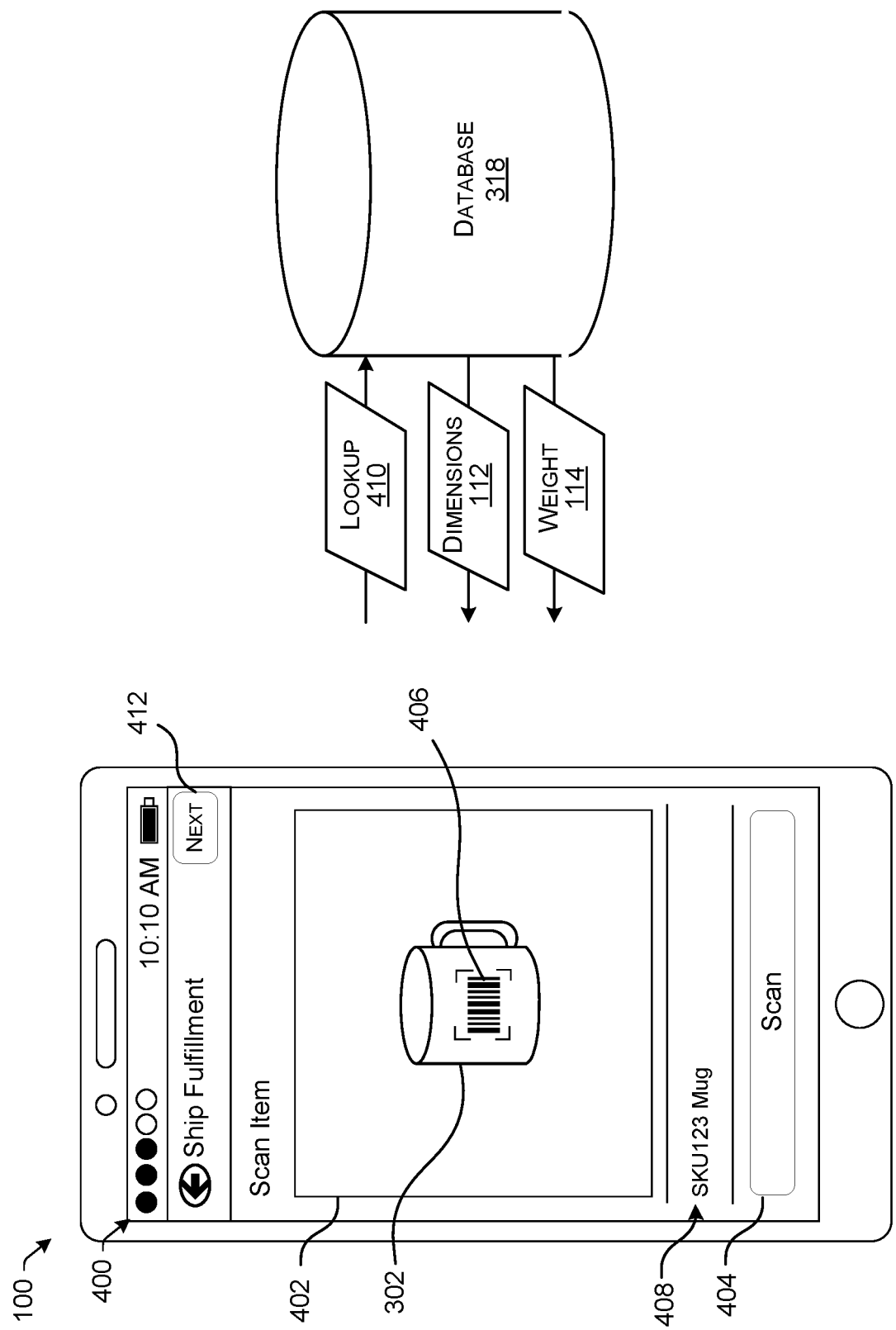
FIG. 4 is an example user interface and a technique for determining the item characteristics of an item (packaged or unpackaged), according to an implementation of the present subject matter.

FIG. 4 is an example user interface 400 and a technique for determining the item characteristics of an item (packaged or unpackaged), such as the dimensions 112 and/or the actual weight 114 of an item, as described herein. The technique illustrated in FIG. 4 can be used to determine the dimensions 112 and/or the actual weights 114 of packaged items (e.g., the item 102) or unpackaged items (e.g., the item 302). In the example of FIG. 4, the user 104 is in the process of determining the dimensions 112 and/or the actual weight 114 of an unpackaged item 302. The user interface 400 may be presented on the display 116 of the computing device 100 when the user 104 opens the application 106 to generate a shipping quote for an item, or at any suitable time. In some examples, the user 104 arrives at the user interface 400 after navigating through one or more user interfaces (not shown in FIG. 4), such as a ship fulfillment user interface where the user 104 selects an option to calculate a new shipping quote for an item. The user interface 400 includes a viewport 402

(or window) that presents image content (e.g., a still image, a live video, etc.) captured by the camera 113 of the computing device 100. In some examples, the viewport 402 presents a live video feed of what the camera 113 of the computing device 100 sees within the field of view of the camera 113. Accordingly, the user 104 may be able to move the computing device 100 around the item 302 and the image content within the viewport 402 updates in real-time to present the views captured by the camera 113 of the computing device 100. In this way, the user 104 can move the computing device 100 to capture imagery of the item 302 from any suitable viewing angle. The user interface 400 may present the words "scan item" to indicate to the user 104 that the current step of the process is to determine the item's 302 identity so that dimensions 112 and/or an actual weight 114 of the item 302 can be determined by the computing device 100.

In some examples, the user 104 may provide user input via the application 106 to cause the camera 113 of the computing device 100 to capture an image of the item 302. For example, the user 104 may select a selectable element 404 (e.g., a "scan" button) presented on the display 116 to cause the camera 113 of the computing device 100 to capture a still image(s) or a video of the item 302 within the viewport 402. In other examples, an image or a video may be captured automatically without user input, such as by the user 104 pointing the camera 113 of the computing device 100 at the item 302 with the machine-readable code 406 in the camera's field of view. In the example of FIG. 4, the image(s) may be analyzed (e.g., by code reader component 119) to detect a machine-readable code 406 in the image(s). Examples of machine-readable codes include, without limitation, a barcode (or Universal Product Code (UPC)), quick response (QR) code, or any other suitable type of machine-readable code.

In the example of FIG. 4, the machine-readable code 406 detected through image analysis correspond to an item identifier (ID) 408 (e.g., SKU123 mug), which identifies a coffee mug. The item ID 408 may be one of many item IDs that identify items of a particular merchant's item catalogue. The item ID 408 may be used in a lookup operation 410 to a database 318 in order to determine dimensions 112 and/or an actual weight 114 associated with the item 302, as described herein. Accordingly, the database 318 may map items to dimensions 112 and/or actual weights 114, and the computing device 100 may access the database 318 to lookup 410 the dimensions 112 and/or the actual weight 114 associated a particular item, such as the coffee mug identified by the machine-readable code 406 in the example of FIG. 4. Once the dimensions 112 and/or the actual weight 114 is/are determined, the user 104 can select a "next" element 412 to navigate to a next user interface, such as the user interface 120 of FIG. 1, where the application 106 presents the DIM weight 110, the actual weight 114, and a device-generated shipping quote (e.g., one or more selectable elements 118 indicating the cost(s) of shipping the item to a delivery location using a delivery service(s) of a fulfillment provider(s)). Again, this presumes that a user (e.g., the user 104) has provided user input via the application 106 that specifies the delivery location where the item is to be shipped, because the shipping quote is at least partly based on the delivery location (e.g., relative to an origin location).

Figure 5:
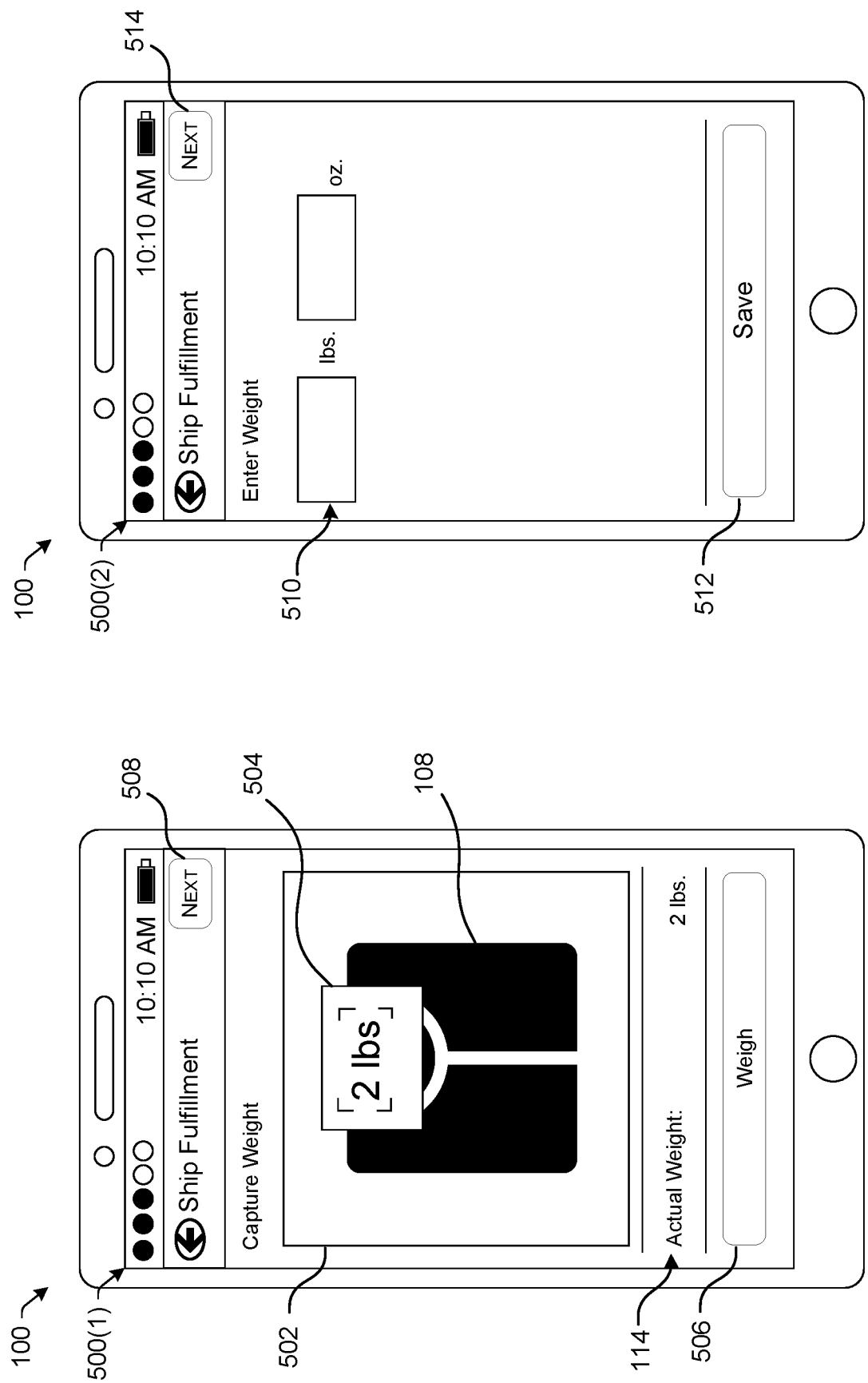
FIG. 5 are other example techniques for determining the item characteristics of an item, according to an implementation of the present subject matter.

FIG. 5 are other example techniques for determining the item characteristics of an item, such as the actual weight 114 of an item 102, 302, as described herein. Example techniques for determining the actual weight 114 of an item 102, 302 were discussed above, such as receiving weight data from a wirelessly-enabled scale 108, and/or accessing a database 318 to determine the actual weight 114 of an item identified using machine learning or a machine-readable code 406. FIG. 5 illustrates additional or alternative ways of determining the actual weight 114.

In the example of FIG. 5, the user interface 500(1) may be presented on the display 116 of the computing device 100 before or after the user 104 determines the dimensions 112 of a package usable to ship an item, or at any suitable time. In some examples, the user 104 arrives at the user interface 500(1) after navigating through one or more user interfaces (not shown in FIG. 5), such as a ship fulfillment user interface where the user 104 selects an option to calculate a new shipping quote for an item. The user interface 500(1) includes a viewport 502 (or window) that presents an image (e.g., a still image(s), a live video, etc.) captured by the camera 113 of the computing device 100. In some examples, the viewport 502 presents a live video feed of what the camera 113 of the computing device 100 sees within the field of view of the camera 113. In FIG. 5, the scale 108 is within the field of view of the camera 113 of the computing device 100. The user 104 may be able to move the computing device 100 around the scale 108, and/or an item resting on the scale 108, and the imagery within the viewport 502 updates in real-time to present the views captured by the camera 113 of the computing device 100. In this way, the user 104 can move the computing device 100 to capture imagery of the scale 108 from any suitable viewing angle. The user interface 500(1) may present the words "capture weight" to indicate to the user 104 that the current step of the process is to determine the actual weight 114 of an item disposed on the scale 108.

In some examples, the user 104 may provide user input via the application 106 to cause the camera 113 of the computing device 100 to capture an image of a display 504 of the scale 108. For example, the user 104 may select a selectable element 506 (e.g., a "weigh" button) presented on the display 116 to cause the camera 113 of the computing device 100 to capture a still image(s) or a video of the display 504 of the scale 108. In other examples, an image or a video may be captured automatically without user input, such as by the user 104 pointing the camera 113 of the computing device 100 at the display 504 of the scale 108. The computing device 100 can analyze the captured imagery to detect text presented on the display 504 and interpret the text as a weight measurement. In the example of FIG. 5, the computing device 100 recognizes the text "2 lbs" based on image analysis of the text presented on the display 504 of the scale 108. This recognized text can be resolved into a determination of the actual weight 114 of an item 102, 302 disposed, or resting, on the scale 108. Once the actual weight 114 is determined, the user 104 can select a "next" element 508 to navigate to a next user interface, such as the user interface 120 of FIG. 1, where the application 106 presents the DIM weight 110, the actual weight 114, and a device-generated shipping quote (e.g., one or more selectable elements 118 indicating the cost(s) of shipping the item to a delivery location using a delivery service(s) of a fulfillment provider(s)). Again, this presumes that a user (e.g., the user 104) has provided user input via the application 106 that specifies the delivery location where the item 102, 302 is to be shipped, because the shipping quote is at least partly based on the delivery location (e.g., relative to an origin location). It also presumes that the DIM weight 110 has been determined for the item 102, 302.

The user interface 500(2) depicted in FIG. 5 illustrates another example way of determining the actual weight 114 of an item 102, 302. In the example of FIG. 5, the user interface 500(2) may be presented on the display 116 of the computing device 100 before or after the user 104 determines the dimensions 112 of a package usable to ship an item, or at any suitable time. In some examples, the user 104 arrives at the user interface 500(2) after navigating through one or more user interfaces (not shown in FIG. 5), such as a ship fulfillment user interface where the user 104 selects an option to calculate a new shipping quote for an item. The user interface 500(2) includes one or more text boxes 510 (or fields) to enter the actual weight 114 of an item. The example of FIG. 5 depicts one text box 510 for entering a number of pounds (lbs.), and another text box 510 for entering a number of ounces (oz.). The user 104 may read this information from a display 504 of the scale 108 while the scale 108 is being used to weigh the item 102, 302. The user interface 500(2) may present the words "enter weight" to indicate to the user 104 that the current step of the process is to determine the actual weight 114 of an item 102, 302 disposed on the scale 108.

In some examples, the user 104 may provide user input via the application 106 to cause the computing device 100 to save the actual weight 114 entered via the text box(es) 510. For example, the user 104 may select a selectable element 512 (e.g., a "save" button) presented on the display 116 to cause the computing device 100 to save the actual weight 114 entered by the user 104. In other examples, the actual weight 114 may be saved automatically upon entry into the text box(es) 510 without additional user input. Once the actual weight 114 is determined (e.g., saved), the user 104 can select a "next" element 514 to navigate to a next user interface, such as the user interface 120 of FIG. 1, where the application 106 presents the DIM weight 110, the actual weight 114, and a device-generated shipping quote (e.g., one or more selectable elements 118 indicating the cost(s) of shipping the item to a delivery location using a delivery service(s) of a fulfillment provider(s)). Again, this presumes that a user (e.g., the user 104) has provided user input via the application 106 that specifies the delivery location where the item 102, 302 is to be shipped, because the shipping quote is at least partly based on the delivery location (e.g., relative to an origin location). It also presumes that the DIM weight 110 has been determined for the item 102, 302.

Figure 6:
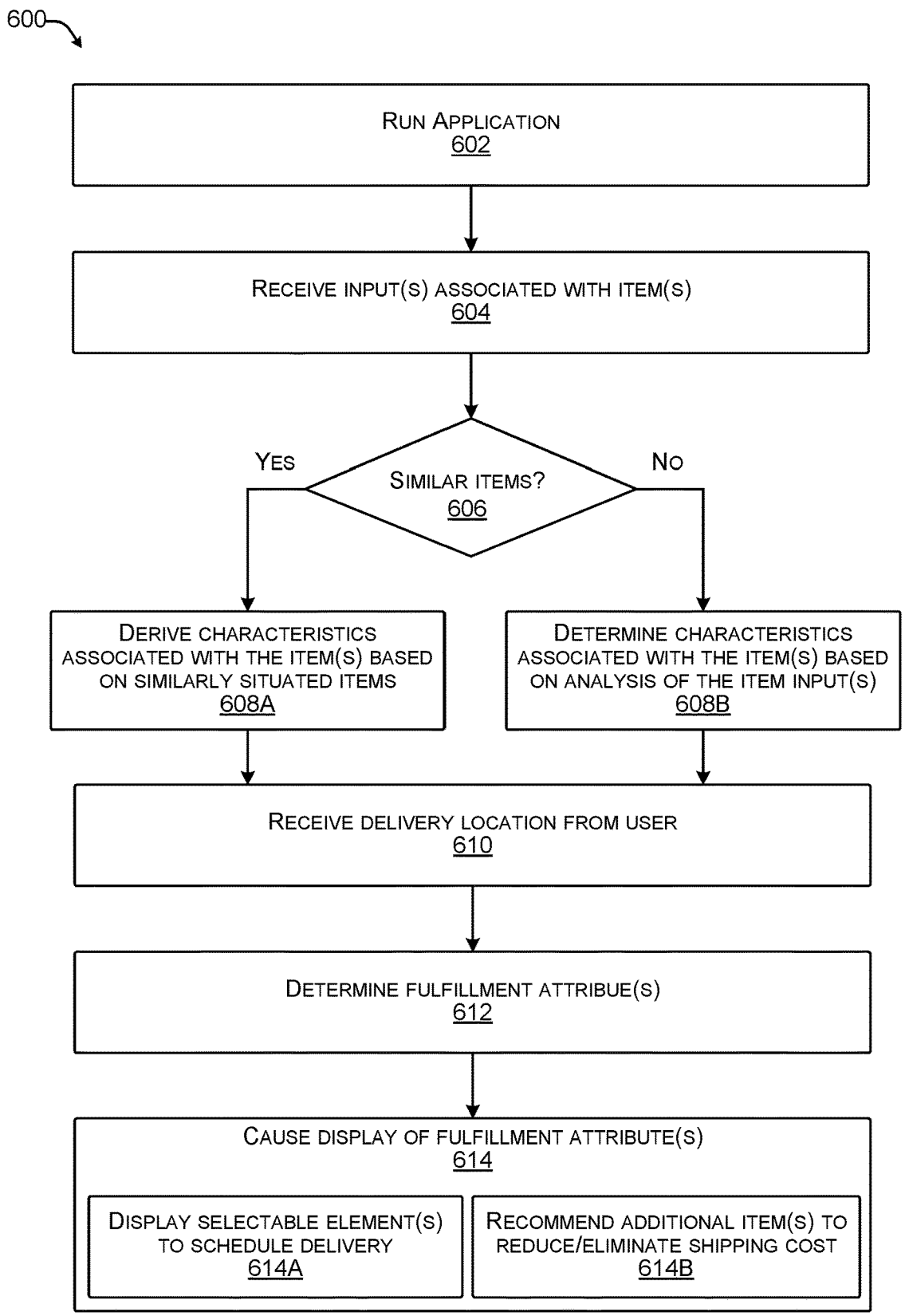
FIG. 6 is an example process for determining a fulfillment attribute for an item and causing display of the fulfillment attribute, according to an implementation of the present subject matter.

FIG. 6 is an example process 600 for determining a fulfillment attribute for an item, such as a cost of shipping an item, and causing display of the fulfillment attribute, as described herein. The process 600 can be implemented by a system including one or more processors and memory storing computer-executable instructions to cause the one or more processors to perform the process 600. In some examples, the process 600 can be implemented by a system (e.g., a computing device 100) that includes a camera (e.g., a camera 113), a display, one or more processors, and memory storing computer-executable instructions to cause the one or more processors to perform the process 600. In some examples, such a computing device 100 may be a POS device that is used at a POS within a merchant location (e.g., at a checkout counter of a brick-and-mortar store). For discussion purposes, the process 600 is described with reference to the previous figures.

At 602, an application is executed. In general, the application executed at block 602 may represent and/or include logic (e.g., software, computer-executable instructions, firmware, etc.) to perform the various acts and/or processes disclosed herein. In some examples, a processor(s) (e.g., a processor(s) 111) may execute (e.g., run) an application at block 602. In some examples, an application executed at block 602 may be the application 106 introduced in FIG. 1, such as a mobile application or a client application installed on a computing device 100. In some examples, the payment processing service provider 105 supplies a computing device 100 to a merchant with the application 106 pre-installed on the computing device 100. In other examples, the merchant or any other user 104 can download the application 106 from an "app store" or from a server computer, such as a server computer associated with the payment processing service provider 105. The application 106 can be updated periodically, such as through software updates that are pushed to the computing device 100 over a wide-area network (e.g., the Internet, a cellular network, etc.). In an example, the user 104 can launch the application 106 by selecting an icon on a home screen of the computing device 100. Once the application 106 is launched, the application 106 is executed by one or more processors of the computing device 100 at block 602.

At 604, one or more inputs associated with an item are received. In some examples, a processor(s) (e.g., a processor(s) 111) may receive one or more inputs at block 604. In some examples, the inputs correspond to visual identifiers of an item. In some examples, visual identifiers of an item can include an image(s) of an item. In some examples, receiving inputs of an item at block 604 includes capturing the image(s) of the item using a camera(s) 113 of the computing device 100 and/or receiving the image(s) by an AR component of the computing device 100. The image(s) received (e.g., captured) at block 604 may include a still image(s), video, or a combination thereof. Further, the inputs can be visual, audio, haptic, or a combination thereof. Accordingly, components such as a microphone, a radio frequency identification (RFID) reader, barcode scanner, infrared (IR) sensor, transceiver (e.g., Bluetooth, WiFi, etc.), and/or a combination thereof can be used in addition to, or in lieu of, the camera 113 to obtain item inputs. The item may be a packaged item 102 or an unpackaged item 302. For example, the item may be a coffee mug packaged in a box that is cuboidal in shape. In another example, the item may be an unpackaged coffee mug. In some examples, the item (packaged or unpackaged) includes a machine-readable code 406 (e.g., a barcode or QR code with embedded information) that is visible within the image(s).

At 606, a determination is made as to whether similarly situated items can be identified based at least in part on the item input(s) (e.g., visual identifiers, such as an image(s)). If one or more similarly situated items are identified based at least in part on the item input(s), the process 600 may follow the YES route to block 608A where one or more characteristics associated with the item are derived, such as by parsing the item input(s) (e.g., visual identifiers) and by comparing the item input(s) (e.g., visual identifiers) with similarly situated items. If no similarly situated items are identified, the process 600 may follow the NO route to block 608B where one or more characteristics associated with the item are determined based at least in part on an analysis of the item input(s).

In some examples, a DIM weight 110 associated with the item is determined (e.g., calculated) based at least in part on the item characteristics determined at block 608 (608A or 608B). In examples where the input(s) correspond to an image(s) of the item, item characteristics may be determined based at least in part on an analysis of the image(s), and the DIM weight 110 may be determined based at least in part on the item characteristics. In some examples, the item characteristics determined at block 608 (608A or 608B) include dimensions 112 of a package that is to be used to ship (or deliver) the item, and the processor(s) calculates the DIM weight 110 based on dimensions 112 of a package that is to be used to ship the item and a dimensional factor specific to a fulfillment provider. In these examples, the dimensions 112 (e.g., a length, a width, and a height of a package) can be determined based on an analysis of the image(s) received (e.g., captured) at block 604. Example techniques for determining the DIM weight 110 based on dimensions 112 are described elsewhere herein, including the process 700 of FIG. 7. In at least one example, an AR component is used to analyze the image(s) and determine dimensions 112 of a package containing the item. For example, the application 106 executing on the computing device 100 may utilize the AR component 115 to analyze the image of the item 102 captured by the camera 113 of the computing device 100 and to determine the dimensions 112 based on image analysis. For example, when the user points the camera 113 of the computing device 100 at the packaged item 102, a live, pass-through video feed may be automatically presented within the viewport 202 of a user interface 200(2) presented on the display 116 of the computing device 100, and the user 104 may provide user input by sequentially touching the display 116 within the viewport 202 at locations that correspond to visible corners of the packaged item 102. For example, when the user 104 touches the display 116 within the viewport 202 at a location near a corner of the packaged item, the AR component 115 may lock an icon (e.g., a small dot) onto the corner of the packaged item 102 that is closest to the location touched by the user 104. The user 104 can then touch the display 116 within the viewport 202 at a second location near another corner, at a third location near another corner, and so on to cause the AR component 115 to lock additional icons onto the additional corners of the packaged item 102 in a similar manner. In this way, the AR component 115 can detect the boundary of the packaged item 102 to determine the dimensions 112 in terms of a length (l), a width (w), and a height (h) of the package. The DIM weight 110 can then be determined based on the dimensions 112. In some examples, a processor(s) (e.g., a processor(s) 111) uses one or more application programming interfaces (APIs) to access external computing systems of one or more fulfillment providers to determine a dimensional factor specific to each of the one or more fulfillment providers. In some examples, retrieval of such information may be done in advance of performing the process 600 such that the information (e.g., fulfillment provider-specific DIM factors) is accessible from a database of the payment processing service provider 105 and/or a database of a merchant where the computing device 100 is being used to determine the DIM weight 110 associated with an item. In other examples, the API(s) can be used in real-time during performance of the process 600 to determine DIM factors specific to various one or more fulfillment providers.

In some examples, an actual weight 114 associated with the item is determined at block 608 (608A or 608B). In some examples, determining of the actual weight 114 at block 608 includes determining the actual weight 114 from a nearby scale 108 and/or from user input. For example, the computing device 100 may receive weight data from the scale 108 via the wireless transceiver of the computing device 100, the weight data indicating the actual weight 114. Such weight data may be received based at least in part on user input received via the application 106, such as the user 104 selecting a selectable element 208 (e.g., a "weigh" button) on a user interface 200(2) presented on a display 116 of the computing device 100, which causes the computing device 100 to send a request to the scale 108 to transmit the weight data indicating the actual weight 114 of the item the scale 108 is currently weighing. In some examples, the user 104 may provide user input via the application 106 to cause the camera 113 of the computing device 100 to capture an image of a display 504 of the scale 108. For example, the user 104 may select a selectable element 506 (e.g., a "weigh" button) on a user interface 500(1) presented on the display 116 to cause the camera 113 of the computing device 100 to capture a still image or a video of the display 504 of the scale 108. In other examples, an image or a video may be captured automatically without user input, such as by the user 104 pointing the camera 113 of the computing device 100 at the display 504 of the scale 108. The computing device 100 can analyze the captured imagery to detect text presented on the display 504 and interpret the text as a weight measurement. This recognized text can be resolved into a determination of the actual weight 114 of an item disposed, or resting, on the scale 108. In some examples, the user 104 may enter the actual weight 114 via a text box(es) 510 of a user interface 500(1) presented on the display 116, and the user 104 may provide additional user input via the application 106 to cause the computing device 100 to save the actual weight 114 entered via the text box(es) 510. For example, the user 104 may select a selectable element 512 (e.g., a "save" button) presented on the display 116 to cause the computing device 100 to save the actual weight 114 entered by the user 104. In other examples, the actual weight 114 may be saved automatically upon entry into the text box(es) 510 without additional user input. In some examples, the actual weight 114 may be determined from accessing a database 318 based on identifying the item and looking up the actual weight 114 of the identified item, as described herein.

At 610, user input indicating a delivery location(s) where the item is to be shipped is detected. In some examples, a processor(s) (e.g., a processor(s) 111) may detect the user input at block 610. The user input detected at block 610 may be received via the application 106 from a user 104. For example, a store clerk or a customer may enter a shipping address by typing the shipping address and/or by uttering a voice command that is interpreted by the processor(s) using speech recognition software. In some examples, detecting user input indicating a delivery location at block 610 may include detecting user input indicating a name, an email address, a phone number, and/or a customer account number that is associated with the delivery location(s) maintained in a customer profile of the customer purchasing the item. Accordingly, a delivery location may not be provided via user input, in some examples, and instead, a delivery location (e.g., a shipping address) on file (e.g., stored in association with a user/customer profile) may be referenced based on user input that indicates the associated user/customer profile. In some examples, two or more delivery locations may be determined at block 610, as specified by a user, for instance. This may be the case where multiple items are being analyzed to determine fulfillment attributes, and a first item is to be shipped to a first location, and a second item is to be shipped to a second location. Furthermore, each item may be delivered using a different fulfillment channel (e.g., a different delivery service, a different fulfillment provider, etc.).

At 612, a fulfillment attribute(s) is/are determined. The fulfillment attribute(s) determined at block 612 may include one of a quote(s) for fulfilling delivery of the item (or a cost(s) of shipping the item to the delivery location using a delivery service(s) of a fulfillment provider(s)), a fulfillment channel, a fulfillment container, a type of packaging material, one or more bundling options to fulfill the delivery of the item, and/or a combination thereof, and/or other fulfillment attributes. In some examples, a processor(s) (e.g., a processor(s) 111) may determine a fulfillment attribute(s) at block 612. The fulfillment attribute(s) is determined at block 612 based on the delivery location and the item characteristics. In examples where the fulfillment attribute(s) include a cost(s) of shipping the item, the cost(s) of shipping the item is determined at block 612 based at least in part on the delivery location, the DIM weight 110, and the actual weight 114. In some examples, a greater of the DIM weight 110 and the actual weight 114 is used to calculate the cost(s) of shipping the item at block 612. In some examples, multiple, different delivery services are available from a fulfillment provider and, hence, multiple, different costs are determined for the multiple, different delivery services at block 612. For example, as depicted in FIG. 1, UPS may offer Next Day Air delivery service, 3 Day delivery service, and Ground delivery service, each being associated with a different cost of shipping the item due to the differences (e.g., speed differences) in the delivery services. In some examples, multiple, different fulfillment providers may be available, such as UPS and FedEx. In this case, multiple, different costs may be determined for the multiple, different fulfillment providers at block 612. In some examples, a processor(s) (e.g., a processor(s) 111) uses one or more APIs to access external computing systems of one or more fulfillment providers to determine delivery services and associated cost options with respect to each of the one or more fulfillment providers. In some examples, retrieval of such information may be done in advance of performing the process 600 such that the information is accessible from a database of the payment processing service provider 105 and/or a database of a merchant where the computing device 100 is being used to determine cost options for shipping the item. In other examples, the API(s) can be used in real-time during performance of the process 600 to determine cost options for various delivery services of one or more fulfillment providers. Accordingly, shipping quotes that are automatically determined by a system (e.g., a computing device 100) using computer-analysis of item imagery and one or more APIs to access fulfillment provider computing systems enables merchants to more-efficiently process transactions, such as by reducing the number of network transmissions made by a store clerk manually looking up various shipping rates from multiple fulfillment providers on the Internet, thereby reducing the computing and/or networking resources to generate a shipping quote. In examples where the fulfillment attribute(s) determined at block 612 include a type of packaging material(s) or dimensions of packaging material(s), the system may determine the optimal packaging material or dimensions of packaging material that fits the dimensional characteristics of the item and is sufficient to protect the item during shipment (e.g., sufficient protection determined by previously successful shipments of substantially similar items within a threshold success metric).

At 614, the fulfillment attribute(s) (e.g., the cost(s)) is presented on the display as a shipping quote for the item. In some examples, a processor(s) (e.g., a processor(s) 111) may cause the cost(s) to be presented on the display at block 614. The fulfillment attribute(s) (e.g., cost(s)) may be displayed via the application 106 on a display 116 of a computing device 100, such as a POS device. This allows for streamlining a checkout process for the customer to purchase the item and to have it delivered to the delivery location instead of carrying the item out of a store with them, as described herein. At sub-block 614A, causing the fulfillment attribute(s) (e.g., cost(s)) to be presented on the display may include causing a selectable element(s) 118 to be presented on the display. An example of this is shown in FIG. 1 where the selectable elements 118(1)-(3) are presented on the computing device 100, each selectable element indicating a respective cost of shipping the item. In this way, the customer or the store clerk (e.g., cashier) can select the selectable element 118 corresponding to a delivery service that the customer would like to use to ship the item 102. Selection of a selectable element 118 may schedule the delivery service for the item to be shipped to the delivery location. At sub-block 614B, the processor(s) may cause presentation of a recommendation to purchase a second item(s) in order to reduce the cost of shipping and/or to obtain free shipping. For example, the processor(s) may determine a difference between a price of the item and a purchase price to obtain free shipping, the price of the item being less than the purchase price to obtain the free shipping, and then the processor(s) may identify, from an item catalogue, a second item(s) at a second price(s) that is equal to or greater than the difference in order to obtain the free shipping. The recommended second item(s) may be related in some way to the item the customer originally decided to purchase. For example, the processor(s) may look for items that customers of the merchant have frequently purchased together, accessories of the item, or similar affinities between items to determine what items to recommend to the customer to reduce, or eliminate, the cost of shipping.

The process 600 may be implemented in various ways to quickly and accurately determine a shipping quote for an item. In one example implementation of the process 600, the process 600 may be performed by a computing device 100 (e.g., a POS device) used by a merchant at a POS. In this example implementation, a store clerk (e.g., a cashier) may open the application 106 (e.g., a mobile application, client application, POS application, etc.) on the POS device to execute the application 106 thereon, and the store clerk may capture the image(s) of the item at block 604 using a camera 113 of the POS device. It is to be appreciated that a "POS device," as used herein, is not limited to a stationary or semi-stationary device, such as a traditional register-type device used by a cashier at a checkout counter. Rather, a "POS device," as used herein, can be any type of computing device described herein, including, without limitation, a tablet computing device, a smart phone or mobile communication device, a laptop, a netbook or other portable computer or semi-portable computer with a camera 113 that can be carried by a user and moved about an environment with minimal effort. An example implementation of such a POS device (computing device 100) is depicted in FIG. 1 as a smart phone. In this example implementation, the computing device 100 can be carried about a store, for example, and used as a POS device at locations other than a checkout counter. The POS device then generates a shipping quote for the item based at least in part on an analysis of the image(s), and the POS device presents the shipping quote on the display 116 of the POS device, such as via selectable elements 118 for the store clerk or the customer to select at a POS in order to select the desired delivery service for shipping the item to a desired delivery location. In some examples, the computing device 100 is a merchant device, but not necessarily a POS device. For example, a store clerk may carry the computing device 100 with them throughout a store and may ask customers if they need help finding anything. If a customer asks the store clerk how much it would cost to ship an item to a particular delivery location, the store clerk can use the computing device 100 to capture an image(s) of the item at block 604 using a camera 113 of the computing device 100. The computing device 100 then generates a shipping quote for the item based at least in part on an analysis of the image(s), and the computing device 100 presents the shipping quote on the display 116 of the computing device 100. This allows the customer who is browsing items to quickly determine the cost(s) of shipping the item to a desired delivery location so that the customer is better informed during a shopping experience.

In another example implementation of the process 600, the process 600 may be performed by a computing device 100 (e.g., a mobile phone) used by a customer who wishes to return an item to a merchant. For example, a customer may have purchased a coffee mug from a merchant, and the customer has now decided to return the coffee mug to the merchant for a refund, a store credit, etc. In this example implementation, the customer may download an application 106 to his/her mobile phone (if the application 106 is not already downloaded to the phone), open the application 106 on the mobile phone to execute the application 106 thereon, and capture the image(s) of the item (e.g., coffee mug) at block 604 using a camera of the mobile phone. The mobile phone then generates a shipping quote for the coffee mug based at least in part on an analysis of the image(s), and the mobile phone presents the shipping quote on the display 116 of the mobile phone, such as via selectable elements 118 for the customer to select in order to select and/or schedule the desired delivery service for shipping the item to a delivery location associated with the merchant's returns department.

In another example implementation of the process 600, the process 600 may be performed by a server computer(s) of an electronic marketplace where independent sellers can post items online for sale. For example, a person may wish to sell an item (e.g., a coffee mug) on an electronic marketplace that facilitates the resale of personal belongings. The electronic marketplace may allow customers to browse items posted by independent sellers. In this example, the seller may take a picture(s) of the coffee mug and post it to the electronic marketplace. An interested buyer may want to purchase the coffee mug via the electronic marketplace and have it shipped to a delivery location. Accordingly, a server computer(s) executing an application 106 (e.g., computer-executable instructions) may receive, at block 604, the image(s) of the coffee mug that was posted by the seller to the electronic marketplace, and may generate a shipping quote for the coffee mug based at least in part on an analysis of the image(s). The server computer(s) may then cause presentation of the shipping quote on a display of a computing device associated with the interested buyer, such as via selectable elements 118 for the buyer to select in order to select and/or schedule the desired delivery service for shipping the item to a delivery location associated with the buyer.

Figure 7:
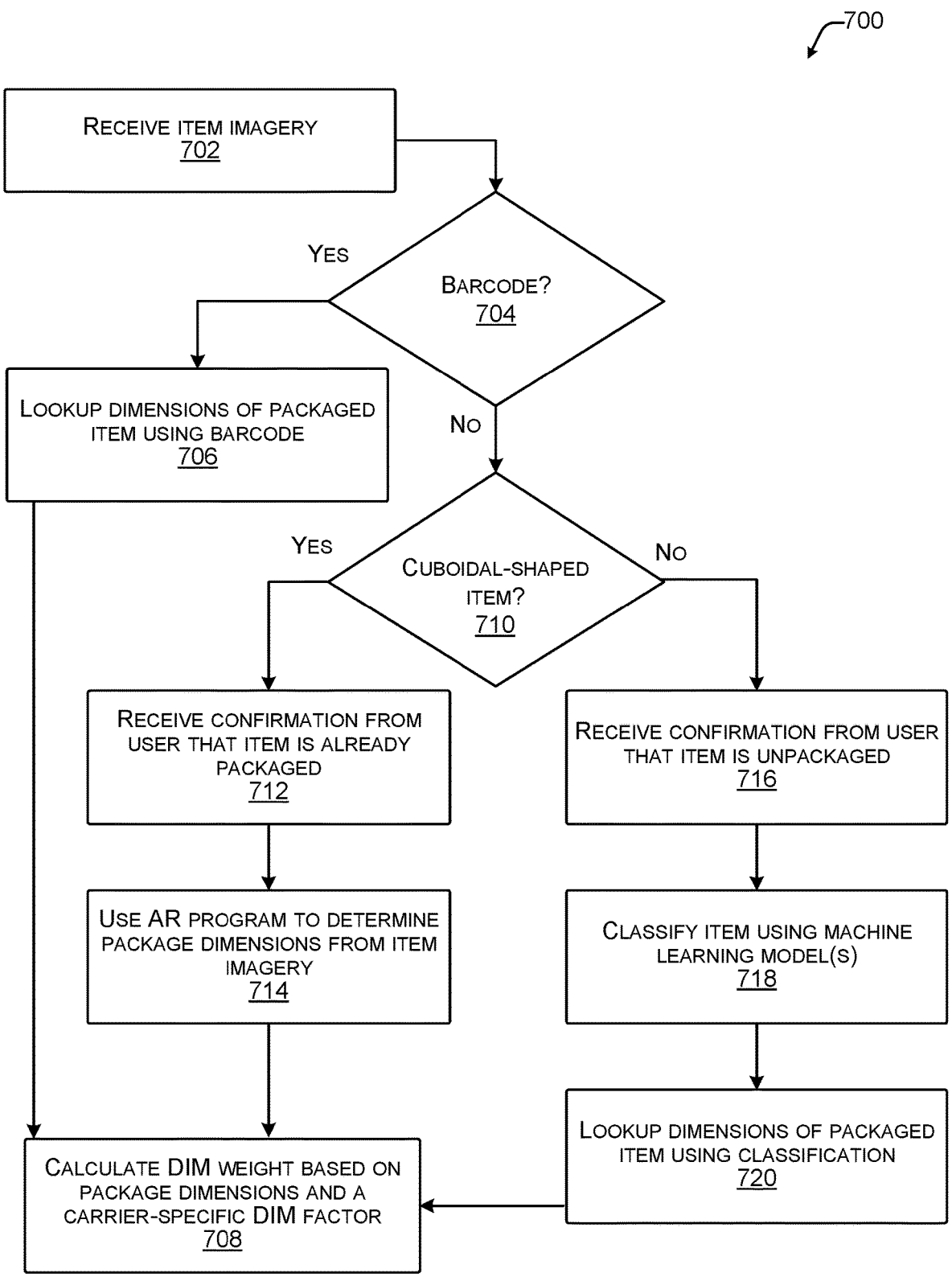
FIG. 7 is an example process for determining item characteristics of an item, according to an implementation of the present subject matter.

FIG. 7 is an example process 700 for determining item characteristics of an item, such as a DIM weight of an item, as described herein. In some examples, the process 700 represents sub-operations that are performed at blocks 604 and 606 of the process 600 to determine a DIM weight associated with an item based at least in part on analysis of an image(s) of the item. The process 700 can be implemented by a system including one or more processors and memory storing computer-executable instructions to cause the one or more processors to perform the process 700. In some examples, the process 700 can be implemented by a system (e.g., a computing device 100) that includes a camera (e.g., a camera 113), a display, one or more processors, and memory storing computer-executable instructions to cause the one or more processors to perform the process 700. In some examples, such a system (e.g., computing device 100) may be a POS device that is used at a POS within a merchant location (e.g., at a checkout counter of a brick-and-mortar store). For discussion purposes, the process 700 is described with reference to the previous figures.

At 702, an image(s) of an item is received. In some examples, a processor(s) (e.g., a processor(s) 111) may receive an image(s) at block 702. In some examples, receiving an image(s) of an item at block 702 includes capturing the image(s) of the item using a camera(s) 113 of a computing device 100. The image(s) received (e.g., captured) at block 702 may include a still image(s), video, or a combination thereof. The item may be a packaged item or an unpackaged item. For example, the item may be a coffee mug packaged in a box that is cuboidal in shape. In another example, the item may be an unpackaged coffee mug. In some examples, the item (packaged or unpackaged) includes a machine-readable code 406 (e.g., a barcode) that is visible within the image(s).

At 704, the image(s) is/are analyzed to determine whether a machine-readable code 406 (e.g., a barcode) is detected in the image(s). In some examples, a processor(s) (e.g., a processor(s) 111) may analyze the image(s) and make the determination at block 704. If a machine-readable code 406 (e.g., a barcode) is detected in the image(s) at block 704, the process 700 may follow the YES route from block 704 to block 706.

At 706, the dimensions 112 of a package that currently contains, or is to contain, the item are looked up (e.g., retrieved) based on the machine-readable code 406. In some examples, a processor(s) (e.g., a processor(s) 111) may look up the dimensions 112 at block 706. For example, if the machine-readable code 406 is on the outside of a packaged item, the processor(s) may look up the dimensions 112 of the package containing the item (i.e., the packaged item). Alternatively, if the machine-readable code 406 is on an unpackaged item, the processor(s) may lookup dimensions 112 of a package that is to contain the item for shipping purposes. In some examples, looking up the dimensions 112 at block 706 includes determining an identifier of the item based at least in part on the machine-readable code 406, and determining, by accessing a database 318 using the identifier of the item, dimensions of a package that currently contains, or is to contain, the item.

At 708, a DIM weight 110 associated with the item is determined. In some examples, a processor(s) (e.g., a processor(s) 111) may determine the DIM weight 110 at block 708. The DIM weight 110 determined at block 708 may be based on the dimensions 112 of the package that currently contains, or is to contain, the item and a DIM factor specific to a fulfillment provider. The dimensions 112 may include a length, a width, and a height of the package.

Returning with reference to block 704, if a determination is made that the image(s) is/are devoid of a machine-readable code, the process 700 may follow the NO route from block 704 to block 710.

At 710, the image(s) is/are analyzed to determine whether the item has a cuboidal shape. In some examples, a processor(s) (e.g., a processor(s) 111) may analyze the image(s) and make the determination at block 710. Determining that the item has a cuboidal shape may include analyzing the image(s) to determine that the angles between faces of the item are substantially right angles (e.g., within a few degrees margin of error) and/or that opposite faces of the item are substantially equal in terms of surface area (e.g., within a few square centimeters margin of error). This means that a shape that is not a rectangular cuboid may nevertheless be determined to be cuboidal at block 710 as long as one or more criteria are satisfied, such as there are no acute or obtuse angles between planar faces of the item, and/or opposite planar faces of the item are not different in terms of surface area. In some examples, a criterion may be satisfied at block 710 if the item does not have any curved surfaces. The satisfaction of one or more of these criteria may be indicative of the item already being packaged in a shipping container (e.g., a box). If the processor(s) determines that the item has a cuboidal shape at block 710, the process 700 may follow the YES route from block 710 to block 712.

At 712, confirmation from a user 104 that the item is already packaged is received. In some examples, a processor(s) (e.g., a processor(s) 111) may receive the confirmation at block 712. For example, the processor(s) may cause presentation, on a display (e.g., via the application 106), of a selectable element to confirm that the item is a packaged item, and the processor(s) may detect (e.g., receive via the application 106) user input selecting the selectable element. In other examples, user confirmation is not requested. For example, if the processor(s) determines that the item has a cuboidal shape with a level of confidence that is equal to or greater than a threshold confidence level, the processor(s) may skip requesting user confirmation at block 712. Alternatively, the processor(s) may be programmed to proceed to block 714 without requesting user confirmation. User confirmation at block 712 may be useful if an unpackaged item happens to be cuboidal in shape. In this case, the user 104 may provide user input indicating that the item is unpackaged despite its cuboidal shape.

At 714, an AR component is used to analyze the image(s) and determine dimensions 112 of a package containing the item, the dimensions of the package comprising a length, a width, and height. In some examples, a processor(s) (e.g., a processor(s) 111) may use the AR component to analyze the image(s) and determine the dimensions 112 at block 714. For example, the application 106 executing on the computing device 100 may utilize the AR component 115 to analyze the image of the item 102 captured by the camera 113 of the computing device 100 and to determine the dimensions 112 based on image analysis. For example, when the user points the camera 113 of the computing device 100 at the packaged item 102, a live, pass-through video feed may be automatically presented within the viewport 202 of a user interface 200(2) presented on the display 116 of the computing device 100, and the user 104 may provide user input by sequentially touching the display 116 within the viewport 202 at locations that correspond to visible corners of the packaged item 102. For example, when the user 104 touches the display 116 within the viewport 202 at a location near a corner of the packaged item 102, the AR component 115 may lock an icon (e.g., a small dot) onto the corner of the packaged item 102 that is closest to the location touched by the user 104. The user 104 can then touch the display 116 within the viewport 202 at a second location near another corner, at a third location near another corner, and so on to cause the AR component 115 to lock additional icons onto the additional corners of the packaged item 102 in a similar manner. In this way, the AR component 115 can detect the boundary of the packaged item 102 to determine the dimensions 112 in terms of a length (l), a width (w), and a height (h) of the package. For packages that are not rectangular cuboids but are still determined to be cuboidal at block 710, the AR component 115 may be configured to detect a longest dimension in each Cartesian coordinate direction (X, Y, and Z). During this process of detecting the boundary of the packaged item 102, the user 104 can move the computing device 100 around the packaged item 102, and while the computing device 100 is moved, any icons presented within the viewport 202 may remain locked onto a corresponding corner of the packaged item 102 until the user 104 is finished touching the display 116 within the viewport 202.

Following block 714, the process 700 may proceed to block 708 where the a DIM weight 110 associated with the item is determined. The DIM weight 110 determined at block 708 may be based at least in part on the dimensions 112 of the package and a DIM factor specific to a fulfillment provider. The dimensions 112 may include a length, a width, and a height of the package.

Returning with reference to block 710, if a determination is made that the item does not have a cuboidal shape (e.g., one or more criteria are not satisfied, such as the item having an acute angle or an obtuse angle, opposite faces of the item having different surface areas, and/or the item having a curved surface, etc.) at block 710, the process 700 may follow the NO route from block 710 to block 716.

At 716, a confirmation from a user 104 that the item is unpackaged is received. In some examples, a processor(s) (e.g., a processor(s) 111) may receive the confirmation at block 716. For example, the processor(s) may cause presentation, on a display (e.g., via the application 106), of a selectable element to confirm that the item is an unpackaged item, and the processor(s) may detect (e.g., receive via the application 106) user input selecting the selectable element. In other examples, user confirmation is not requested. For example, if the processor(s) determines that the item does not have a cuboidal shape with a level of confidence that is equal to or greater than a threshold confidence level, the processor(s) may skip requesting user confirmation at block 716. Alternatively, the processor(s) may be programmed to proceed to block 718 without requesting user confirmation.

At 718, the item is classified using a trained machine learning model(s) 310. In some examples, a processor(s) (e.g., a processor(s) 111) may use the trained machine learning model(s) 310 to classify the item at block 718. For example, the application 106 executing on the computing device 100 may provide, as input to a machine learning model(s) 310, the image(s) received (e.g., captured) at block 702, and the machine learning model(s) 310 may generate a classification 312 of the item as output. In some examples, the classification 312 generated as output from the trained machine learning model(s) 310 at block 718 can include a score that indicates, or otherwise relates to, a probability of the image(s) being classified in one of multiple classes that indicate a type of item. For instance, the score output from the trained machine learning model(s) 310 may relate to a probability that the image(s) is an item of a particular type or class. In some embodiments, the score output from the trained machine learning model(s) 310 is a variable that is normalized in the range of [0,1]. The score that is output by the trained machine learning model(s) 310 can indicate a level of confidence that the item depicted in the image(s) is of a particular class of items. In some examples, the machine learning model(s) 310 may output a classification 312 at block 718 as a label of the item type and/or an item ID 314 (e.g., SKU123 mug), possibly with the score mentioned above. This may be due to the fact that the machine learning model(s) 310 is trained to recognize items of a particular merchant's item catalogue, and is therefore able to classify the item with a particular item ID 314.

At 720, the classification 312 and/or item ID 314 may be used in a lookup operation 316 to a database 318 in order to determine dimensions 112 associated with the item. For example, a merchant may have previously measured the dimensions of packages used to ship items in the merchant's inventory and recorded the dimensions 112 in the database 318. Accordingly, the database 318 may map items to at least dimensions 112, and the computing device 100 may, at block 720, determine, by accessing the database 318 based at least in part on the classification 312 (e.g., using the classification 312 and/or the item ID 314 of the item determined from the classification 312), dimensions 112 of a package that is to contain the item. It is to be appreciated that an actual weight 114 of the item may be determined with the lookup operation 316 performed at block 720 as well.

Following block 720, the process 700 may proceed to block 708 where a DIM weight 110 associated with the item is determined. The DIM weight 110 determined at block 708 may be based at least in part on the dimensions 112 of the package and a DIM factor specific to a fulfillment provider. The dimensions 112 may include a length, a width, and a height of the package. An example formula for calculating the DIM weight 110 of an item at block 708 is $$\frac{L \times W \times H}{DIM \text{ Factor}},$$

where L is the length of the package containing the item 102, W is the width of the package containing the item 102, H is the height of the package that is to be used to ship the item to a delivery location, and the DIM factor is a fulfillment provider-specific DIM factor. In an example where a packaged item is contained in a cuboidal box measuring 10 inches in every direction, and using a fulfillment provider-specific DIM factor of 166, the DIM weight 110 is calculated as $$\frac{10 \times 10 \times 10}{166} = 6.02,$$

which is can be rounded up, in some examples, to arrive at a DIM weight of 7 lbs.

Figure 8:
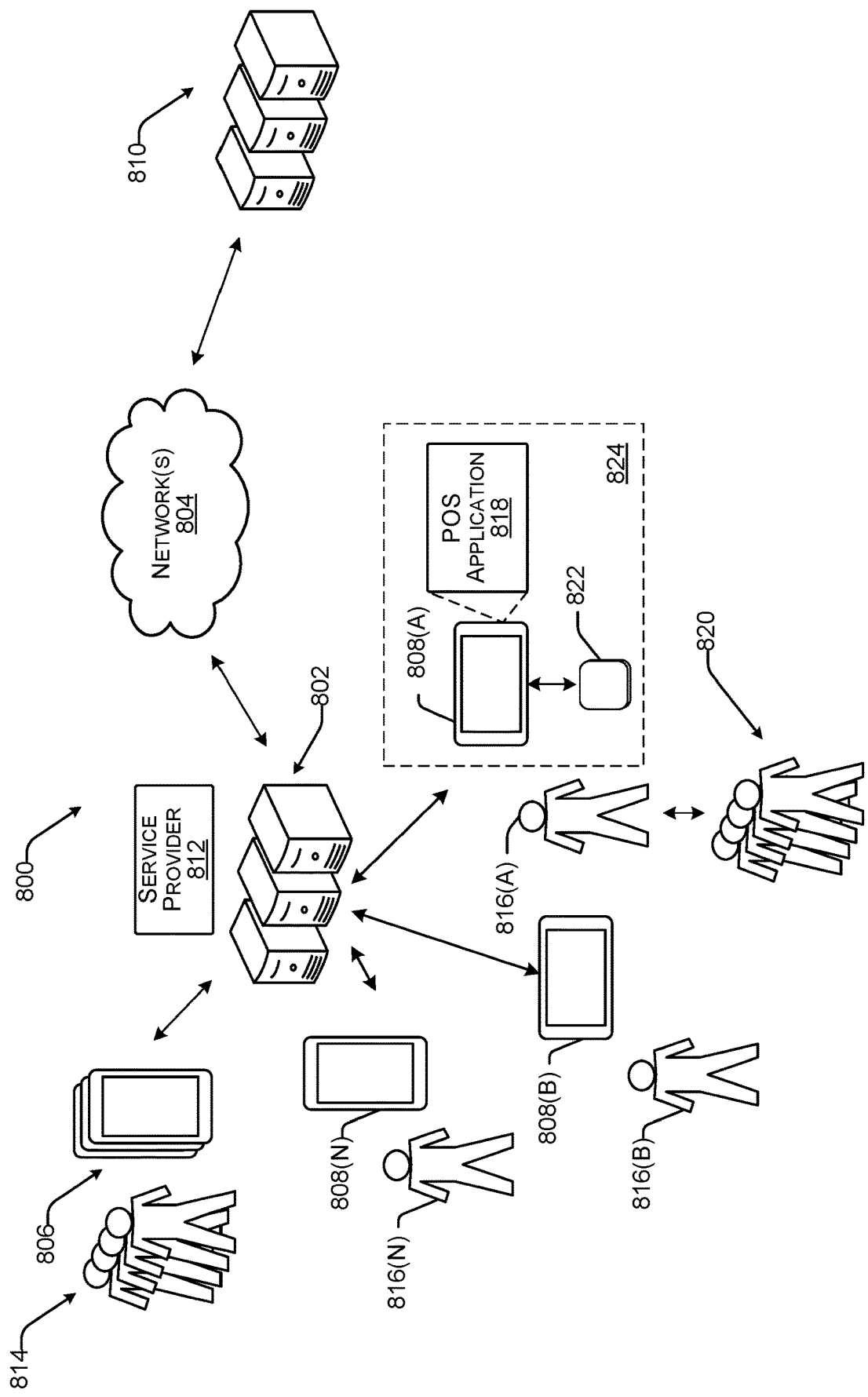
FIG. 8 is an example environment for performing techniques described herein.

FIG. 8 is an example environment 800 for performing techniques described herein. The environment 800 includes server computing device(s) 802 that can communicate over a network 804 with user devices 806, merchant devices 808 (individually, 808(A)-808(N)), and/or server computing device(s) 810 associated with third-party service provider(s). The server computing device(s) 802 can be associated with a service provider 812 (e.g., the payment processing service provider 105 introduced in FIG. 1) that can provide one or more services for the benefit of users 814, merchants 816 (individually, 816(A)-816(N)), and/or customers 820, as described herein. Actions attributed to the service provider 812 can be performed by the server computing device(s) 802.

With reference to FIG. 1, a merchant device 808 can correspond to the computing device(s) 100 configured to perform the various acts and/or processes described herein (e.g., to automatically generate fulfillment attributes for an item). Additionally, or alternatively, a user device 806 can correspond to the computing device(s) 100 configured to perform the various acts and/or processes described herein (e.g., to automatically generate fulfillment attributes for an item). Additionally, or alternatively, the server computing device(s) 802 and/or the server computing device(s) 810 may be configured to perform the various acts and/or processes described herein (e.g., to automatically generate fulfillment attributes for an item). In at least one example, the service provider 812 can correspond to the ecommerce service provider and/or the payment processing service provider described above with reference to the previous figures. In an illustrative example, one or more of a user device 806, a merchant device 808, and/or a server computing device(s) 802, 810 may include logic, such as the application 106 described herein, to automatically generate a shipping quote for shipping an item to a delivery location and causing display of the auto-generated shipping quote. In the example of a user device 806 and/or a merchant device 808 implementing the techniques described herein, the auto-generated shipping quote may be displayed on respective displays of those devices 806 and/or 808. In the example of a server computing device(s) 802, 810 implementing the techniques described herein, the server computing device(s) 802, 810 may send data to a user device 806 and/or a merchant device 808 for display of an auto-generated shipping quote on respective displays of those devices 806 and/or 808.

Each one of the plurality of user devices 806 and/or merchant devices 808 can be any type of computing device such as a tablet computing device, a smart phone or mobile communication device, a laptop, a netbook or other portable computer or semi-portable computer, a digital camera, a desktop computing device, a terminal computing device or other semi-stationary or stationary computing device, a dedicated device, a wearable computing device or other body-mounted computing device, an AR device, a virtual reality (VR) device, an Internet of Things (IoT) device, etc. In some examples, individual ones of the user devices 806 can be operable by users 814. The users 814 can be referred to as customers, buyers, borrowers, employers, payors, payees, couriers and so on. The users 814 can interact with the user devices 806 via user interfaces (e.g., graphical user interfaces presented via the user devices 806). In at least one example, a user interface can be presented via a web browser, or the like. In other examples, a user interface can be presented via an application, such as a mobile application or desktop application, which can be provided by the service provider 812 or which can be an otherwise dedicated application. In some examples, such an application can correspond to the application 106 described above with reference to the previous figures. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

In an example, the merchants 816 can operate respective merchant devices 808, which can be user devices 806 configured for use by merchants 816. The merchants 816 can be referred to as merchants, sellers, borrowers, employees, store clerks, cashiers, assistants, attendants, managers, etc. For the purpose of this discussion, a "merchant" can be any entity that offers items (e.g., goods or services) for purchase or other means of acquisition (e.g., rent, borrow, barter, etc.). The merchants 816 can offer items for purchase or other means of acquisition via brick-and-mortar stores, mobile stores (e.g., pop-up shops, food trucks, etc.), online stores, combinations of the foregoing, and so forth. In some examples, at least some of the merchants 816 can be associated with a same entity but can have different merchant locations and/or can have franchise/franchisee relationships. In additional or alternative examples, the merchants 816 can be different merchants. That is, in at least one example, the merchant 816(A) is a different merchant than the merchant 816(B) and/or the merchant 816(N).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 808 can have an instance of a POS application 818 stored thereon. In some examples, the POS application 818 can correspond to the application 106 described above with reference to the previous figures. The POS application 818 can configure the merchant device 808 as a POS device, which enables the merchant 816(A) to interact with one or more customers 820. In some examples, the users 814 can include customers, such as the customers 820 shown as interacting with the merchant 816(A) in FIG. 8. For the purpose of this discussion, a "customer" can be any entity that acquires items from merchants. While four customers 820 are illustrated in FIG. 8, any number of customers 820 can interact with the merchants 816. Further, while FIG. 8 illustrates the customers 820 interacting with the merchant 816(A), the customers 820 can interact with any of the merchants 816.

In at least one example, interactions between the customers 820 and the merchants 816 that involve the exchange of funds (from the customers 820) for items (from the merchants 816) can be referred to as "POS transactions" and/or "transactions." In at least one example, the POS application 818 can determine transaction data associated with the POS transactions. Transaction data can include payment information, which can be obtained from a reader device 822 associated with the merchant device 808(A), user authentication data, purchase amount information, point-of-purchase information (e.g., item(s) purchased, date of purchase, time of purchase, etc.), etc. The POS application 818 can send transaction data to the server computing device(s) 802. Furthermore, the POS application 818 can present a UI to enable the merchant 816(A) to interact with the POS application 818 and/or the service provider 812 via the POS application 818.

In at least one example, the merchant device 808(A) can be a special-purpose computing device configured as a POS device (via the execution of the POS application 818). In at least one example, the POS device may be connected to a reader device 822, which is capable of accepting a variety of payment instruments, such as credit cards, debit cards, gift cards, short-range communication based payment instruments, and the like, as described below. In at least one example, the reader device 822 can plug in to a port in the merchant device 808(A), such as a microphone port, a headphone port, an audio-jack, a data port, or other suitable port. In additional or alternative examples, the reader device 822 can be coupled to the merchant device 808(A) via another wired or wireless connection, such as via a Bluetooth®, BLE, and so on. Additional details are described below with reference to FIG. 9. In some examples, the reader device 822 can read information from alternative payment instruments including, but not limited to, wristbands and the like.

In some examples, the reader device 822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS device may provide a rich user interface, communicate with the reader device 822, and communicate with the server computing device(s) 802, which can provide, among other services, a payment processing service. The server computing device(s) 802 associated with the service provider 812 can communicate with server computing device(s) 810, as described below. In this manner, the POS device and reader device 822 may collectively process transaction(s) between the merchants 816 and customers 820. In some examples, POS devices and reader devices can be configured in one-to-one pairings. In other examples, the POS devices and reader devices can be configured in many-to-one pairings (e.g., one POS device coupled to multiple reader devices or multiple POS devices coupled to one reader device). In some examples, there could be multiple POS device(s) connected to a number of other devices, such as "secondary" terminals, to allow for information from the secondary terminal to be shared between the primary POS device(s) and secondary terminal(s).

While, the POS device and the reader device 822 of the POS system 824 are shown as separate devices, in additional or alternative examples, the POS device and the reader device 822 can be part of a single device. In some examples, the reader device 822 can have a display integrated therein for presenting information to the customers 820. In additional or alternative examples, the POS device can have a display integrated therein for presenting information to the customers 820. POS systems, such as the POS system 824, may be mobile, such that POS devices and reader devices may process transactions in disparate locations across the world. POS systems can be used for processing card-present transactions and card-not-present (CNP) transactions, as described below.

A card-present transaction is a transaction where both a customer 820 and his or her payment instrument are physically present at the time of the transaction. Card-present transactions may be processed by swipes, dips, taps, or any other interaction between a physical payment instrument (e.g., a card), or otherwise present payment instrument, and a reader device 822 whereby the reader device 822 is able to obtain payment data from the payment instrument. A swipe is a card-present transaction where a customer 820 slides a card, or other payment instrument, having a magnetic strip through a reader device 822 that captures payment data contained in the magnetic strip. A dip is a card-present transaction where a customer 820 inserts a payment instrument having an embedded microchip (i.e., chip) into a reader device 822 first. The dipped payment instrument remains in the payment reader until the reader device 822 prompts the customer 820 to remove the card, or other payment instrument. While the payment instrument is in the reader device 822, the microchip can create a one-time code which is sent from the POS system 824 to the server computing device(s) 810 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 820 may tap or hover his or her payment instrument (e.g., card, electronic device such as a smart phone running a payment application, etc.) over a reader device 822 to complete a transaction via short-range communication (e.g., NFC, RFID, Bluetooth®, BLE, etc.). Short-range communication enables the payment instrument to exchange information with the reader device 822. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 824, the server computing device(s) 802, and/or the server computing device(s) 810 may exchange payment information and transaction data to determine whether transactions are authorized. For example, the POS system 824 may provide encrypted payment data, user authentication data, purchase amount information, point-of-purchase information, etc. (collectively, transaction data) to server computing device(s) 802 over the network(s) 804. The server computing device(s) 802 may send the transaction data to the server computing device(s) 810. As described above, in at least one example, the server computing device(s) 810 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 810 associated therewith) can send a fund transfer request to a server computing device of a card payment network (e.g., Mastercard®, VISA®, etc.) to determine whether the transaction is authorized or deficient. In at least one example, the service provider 812 can serve as an acquirer and connect directly with the card payment network.

The card payment network (e.g., the server computing device(s) 810 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 810 associated therewith) can make a determination as to whether the customer has the capacity to absorb the relevant charge associated with the payment transaction. In at least one example, the service provider 812 can serve as an issuer and/or can partner with an issuer. The transaction is either approved or rejected by the issuer and/or the card payment network (e.g., the server computing device(s) 810 associated therewith), and a payment authorization message is communicated from the issuer to the POS device via a path opposite of that described above, or via an alternate path.

As described above, the server computing device(s) 810, which can be associated with payment service provider(s), may determine whether the transaction is authorized based on the transaction data, as well as information relating to parties to the transaction (e.g., the customer 820 and/or the merchant 816(A)). The server computing device(s) 810 may send an authorization notification over the network(s) 804 to the server computing device(s) 802, which may send the authorization notification to the POS system 824 over the network(s) 804 to indicate whether the transaction is authorized. The server computing device(s) 802 may also transmit additional information such as transaction identifiers to the POS system 824. In one example, the server computing device(s) 802 may include a merchant application and/or other functional components for communicating with the POS system 824 and/or the server computing device(s) 810 to authorize or decline transactions.

Based on the authentication notification that is received by the POS system 824 from server computing device(s) 802, the merchant 816(A) may indicate to the customer 820 whether the transaction has been approved. In some examples, approval may be indicated at the POS system 824, for example, at a display of the POS system 824. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 812 can provide, among other services, payment processing services, inventory management services, catalog management services, business banking services, financing services, web-development services, payroll services, employee management services, appointment services, restaurant management services, order management services, delivery/courier services, peer-to-peer payment services, onboarding services, identity verification (IDV) services, and so on. In some examples, the users 814 can access all of the services of the service provider 812. In other examples, the users 814 can have gradated access to the services, which can be based on risk tolerance, IDV outputs, subscriptions, and so on. In at least one example, access to such services can be availed to the merchants 816 via the POS application 818. In additional or alternative examples, each service can be associated with its own access point (e.g., application, web browser, etc.).

The service provider 812 can offer payment processing services for processing payments on behalf of the merchants 816, as described above. For example, the service provider 812 can provision payment processing software, payment processing hardware and/or payment processing services to merchants 816, as described above, to enable the merchants 816 to receive payments from the customers 820 when conducting POS transactions with the customers 820. For instance, the service provider 812 can enable the merchants 816 to receive cash payments, payment card payments, and/or electronic payments from customers 820 for POS transactions and the service provider 812 can process transactions on behalf of the merchants 816.

As the service provider 812 processes transactions on behalf of the merchants 816, the service provider 812 can maintain accounts or balances for the merchants 816 in one or more ledgers. For example, the service provider 812 can analyze transaction data received for a transaction to determine an amount of funds owed to a merchant 816(A) for the transaction. In at least one example, such an amount can be a total purchase price less fees charged by the service provider 812 for providing the payment processing services. Based on determining the amount of funds owed to the merchant 816(A), the service provider 812 can deposit funds into an account of the merchant 816(A). The account can have a stored balance, which can be managed by the service provider 812. The account can be different from a conventional bank account at least because the stored balance is managed by a ledger of the service provider 812 and the associated funds are accessible via various withdrawal channels including, but not limited to, scheduled deposit, same-day deposit, instant deposit, and a linked payment instrument.

A scheduled deposit can occur when the service provider 812 transfers funds associated with a stored balance of the merchant 816(A) to a bank account of the merchant 816(A) that is held at a bank or other financial institution (e.g., associated with the server computing device(s) 810). Scheduled deposits can occur at a prearranged time after a POS transaction is funded, which can be a business day after the POS transaction occurred, or sooner or later. In some examples, the merchant 816(A) can access funds prior to a scheduled deposit. For instance, the merchant 816(A) may have access to same-day deposits (e.g., wherein the service provider 812 deposits funds from the stored balance to a linked bank account of the merchant on a same day as POS transaction, in some examples prior to the POS transaction being funded) or instant deposits (e.g., wherein the service provider 812 deposits funds from the stored balance to a linked bank account of the merchant on demand, such as responsive to a request). Further, in at least one example, the merchant 816(A) can have a payment instrument that is linked to the stored balance that enables the merchant to access the funds without first transferring the funds from the account managed by the service provider 812 to the bank account of the merchant 816(A).

In at least one example, the service provider 812 may provide inventory management services. That is, the service provider 812 may provide inventory tracking and reporting. Inventory management services may enable the merchant 816(A) to access and manage a database storing data associated with a quantity of each item that the merchant 816(A) has available (i.e., an inventory). Furthermore, in at least one example, the service provider 812 can provide catalog management services to enable the merchant 816(A) to maintain a catalog, which can be a database storing data associated with items that the merchant 816(A) has available for acquisition (i.e., catalog management services). In at least one example, the catalog may include a plurality of data items and a data item of the plurality of data items may represent an item that the merchant 816(A) has available for acquisition.

In at least one example, the service provider 812 can provide business banking services, which allow the merchant 816(A) to track deposits (from payment processing and/or other sources of funds) into an account of the merchant 816(A), payroll payments from the account (e.g., payments to employees of the merchant 816(A)), payments to other merchants (e.g., business-to-business) directly from the account or from a linked debit card, withdrawals made via scheduled deposit and/or instant deposit, etc. Furthermore, the business banking services can enable the merchant 816(A) to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 816 to visualize their cash flow to track their financial health, set aside money for upcoming obligations (e.g., savings), organize money around goals, etc.

In at least one example, the service provider 812 can provide financing services and products, such as via business loans, consumer loans, fixed term loans, flexible term loans, and the like. In at least one example, the service provider 812 can utilize one or more risk signals to determine whether to extend financing offers and/or terms associated with such financing offers.

In at least one example, the service provider 812 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 812 can offer different types of capital loan products. For instance, in at least one example, the service provider 812 can offer a daily repayment loan product, wherein a capital loan is repaid daily, for instance, from a portion of transactions processed by the payment processing service on behalf of the borrower. Additionally and/or alternatively, the service provider 812 can offer a monthly repayment loan product, wherein a capital loan is repaid monthly, for instance, via a debit from a bank account linked to the payment processing service.

Additionally or alternatively, the service provider 812 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 816. The service provider 812 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 812 (e.g., from payments owed to the merchant from payments processed on behalf of the merchant, funds transferred to the merchant, etc.). The service provider 812 can offer specific financial products, such as payment instruments, tied specifically to the loan products. For example, in one implementation, the server provider 812 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 812 can provide web-development services, which enable users 814 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page).

Further, in addition to websites, the web-development services can create and maintain other online omni-channel presences, such as social media posts for example.

Furthermore, the service provider 812 can provide payroll services to enable employers to pay employees for work performed on behalf of employers. In at least one example, the service provider 812 can receive data that includes time worked by an employee, sales made by the employee, gratuities received by the employee, and so forth. Based on such data, the service provider 812 can make payroll payments to employee(s) on behalf of an employer via the payroll service. For instance, the service provider 812 can facilitate the transfer of a total amount to be paid out for the payroll of an employee from the bank of the employer to the bank of the service provider 812 to be used to make payroll payments. In at least one example, when the funds have been received at the bank of the service provider 812, the service provider 812 can pay the employee, such as by check or direct deposit, often a day, a week, or more after when the work was actually performed by the employee. In additional or alternative examples, the service provider 812 can enable employee(s) to receive payments via same-day or instant deposit based at least in part on risk and/or reliability analyses performed by the service provider 812.

Moreover, in at least one example, the service provider 812 can provide employee management services for managing schedules of employees. Further, the service provider 812 can provide appointment services for enabling users 814 to set schedules for scheduling appointments and/or users 814 to schedule appointments.

In some examples, the service provider 812 can provide restaurant management services to enable users 814 to make and/or manage reservations, to monitor front-of-house and/or back-of-house operations, and so on. In such examples, the merchant device(s) 808 and/or server computing device(s) 802 can be configured to communicate with one or more other computing devices, which can be located in the front-of-house (e.g., POS device(s)) and/or back-of-house (e.g., kitchen display system(s) (KDS)). In at least one example, the service provider 812 can provide order management services and/or delivery services to enable restaurants to manage open tickets, split tickets, and so on and/or manage delivery services. In some examples, such services can be associated with restaurant merchants, as described above. In additional or alternative examples, such services can be any type of merchant.

In at least one example, the service provider 812 can provide courier services, wherein couriers can travel between multiple locations to provide delivery services, photography services, etc. Couriers can be users 814 who can travel between locations to perform services for a requesting user 814 (e.g., deliver items, capture images, etc.). In some examples, the courier can receive compensation from the service provider 812. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 812 can receive requests for courier services, automatically assign the requests to active couriers, and communicate dispatch instructions to couriers via user interface (e.g., application, web browser, or other access point) presented via respective devices 806.

In at least one example, the service provider 812 can provide a peer-to-peer payment service that enables peer-to-peer payments between two or more users 814. In at least one example, the service provider 812 can communicate with instances of a payment application (or other access point) installed on devices 806 configured for operation by users 814. In an example, an instance of the payment application executing on a first device operated by a payor can send a request to the service provider 812 to transfer an amount of funds (e.g., fiat currency or non-fiat currency such as cryptocurrency, securities, and related assets) from an account of the payor to an account of a payee (e.g., a peer-to-peer payment). The service provider 812 can facilitate the transfer and can send a notification to an instance of the payment application executing on a second mobile device operated by the payee that the transfer is in process (or has been completed). In some examples, the service provider 812 can send additional or alternative information to the instances of the payment application (e.g., low balance to the payor, current balance to the payor or the payee, etc.). In some examples, the payor can transfer funds to the payee unprompted. In other examples, the payee can send a request for funds to the payor prior to the payor initiating the transfer of funds. The funds transferred can be associated with any digital currency type, including, but not limited to, cash, cryptocurrency, etc.

In at least one example, a user 814 may be new to the service provider 812 such that the user 814 that has not registered (e.g., subscribed to receive access to one or more services offered by the service provider) with the service provider 812. The service provider 812 can offer onboarding services for registering a potential user 814 with the service provider 812. In some examples, onboarding can involve presenting various questions, prompts, and the like to a potential user 814 to obtain information that can be used to generate a profile for the potential user 814. In at least one example, the service provider 812 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 814 providing all necessary information, the potential user 814 can be onboarded to the service provider 812. In such an example, any limited or short-term access to services of the service provider 812 can be transitioned to more permissive (e.g., less limited) or longer-term access to such services.

The service provider 812 can be associated with IDV services, which can be used by the service provider 812 for compliance purposes and/or can be offered as a service, for instance to third-party service providers (e.g., associated with the server computing device(s) 810). That is, the service provider 812 can offer IDV services to verify the identity of users 814 and/or merchants 816 seeking to use or using their services. Identity verification requires a customer (or potential customer) to provide information that is used by compliance departments to prove that the information is associated with an identity of a real person or entity. In at least one example, the service provider 812 can perform services for determining whether identifying information provided by a user 814 accurately identifies the customer (or potential customer) (i.e., Is the customer who they say they are?).

The service provider 812 is capable of providing additional or alternative services and the services described above are offered as a sampling of services. In the context of the present disclosure, the service provider 812 can provide a shipping quote service to generate a quote for shipping an item to a delivery location based on captured imagery of the item, as described herein. In some examples, a shipping quote service may be provided as part of a payment processing service, and/or as part of any of the other services described herein. In at least one example, the service provider 812 can exchange data with the server computing device(s) 810 associated with third-party service providers. Such third-party service providers can provide information that enables the service provider 812 to provide services, such as those described above. In additional or alternative examples, such third-party service providers can access services of the service provider 812. That is, in some examples, the third-party service providers can be subscribers, or otherwise access, services of the service provider 812.

Techniques described herein can be configured to operate in both real-time/online and offline modes. "Online" modes refer to modes when devices are capable of communicating with the service provider 812 (e.g., the server computing device(s) 802) and/or the server computing device(s) 810 via the network(s) 804. In some examples, the merchant device(s) 808 are not capable of connecting with the service provider 812 (e.g., the server computing device(s) 802) and/or the server computing device(s) 810, due to a network connectivity issue, for example. In additional or alternative examples, the server computing device(s) 802 are not capable of communicating with the server computing device(s) 810 due to network connectivity issue, for example. In such examples, devices may operate in "offline" mode where at least some payment data is stored (e.g., on the merchant device(s) 808) and/or the server computing device(s) 802 until connectivity is restored and the payment data can be transmitted to the server computing device(s) 802 and/or the server computing device(s) 810 for processing.

Techniques described herein are directed to services provided via a distributed system of user devices 806 and/or merchant devices 808 that are in communication with one or more server computing devices 802 of the service provider 812. That is, techniques described herein are directed to a specific implementation—or, a practical application—of utilizing a distributed system of user devices 806 and/or merchant devices 808 that are in communication with one or more server computing devices 802 of the service provider 812 to perform a variety of services, as described above. The unconventional configuration of the distributed system described herein enables the server computing device(s) 802 that are remotely-located from end-users (e.g., users 814, merchants 816, etc.) to intelligently offer services based on aggregated data associated with the end-users, such as the users 814 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. As described herein, artificial intelligence, machine learning, and the like can be used to dynamically make determinations, recommendations, and the like, thereby adding intelligence to an otherwise one-size-fits-all scheme for providing payment processing services and/or additional or alternative services described herein. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 814 and user devices 806 and/or merchants 816 and merchant devices 808. Furthermore, such features are changed dynamically based on the profiles of the users involved interacting with the GUIs. As such, techniques described herein are directed to improvements to computing systems.

Figure 9:
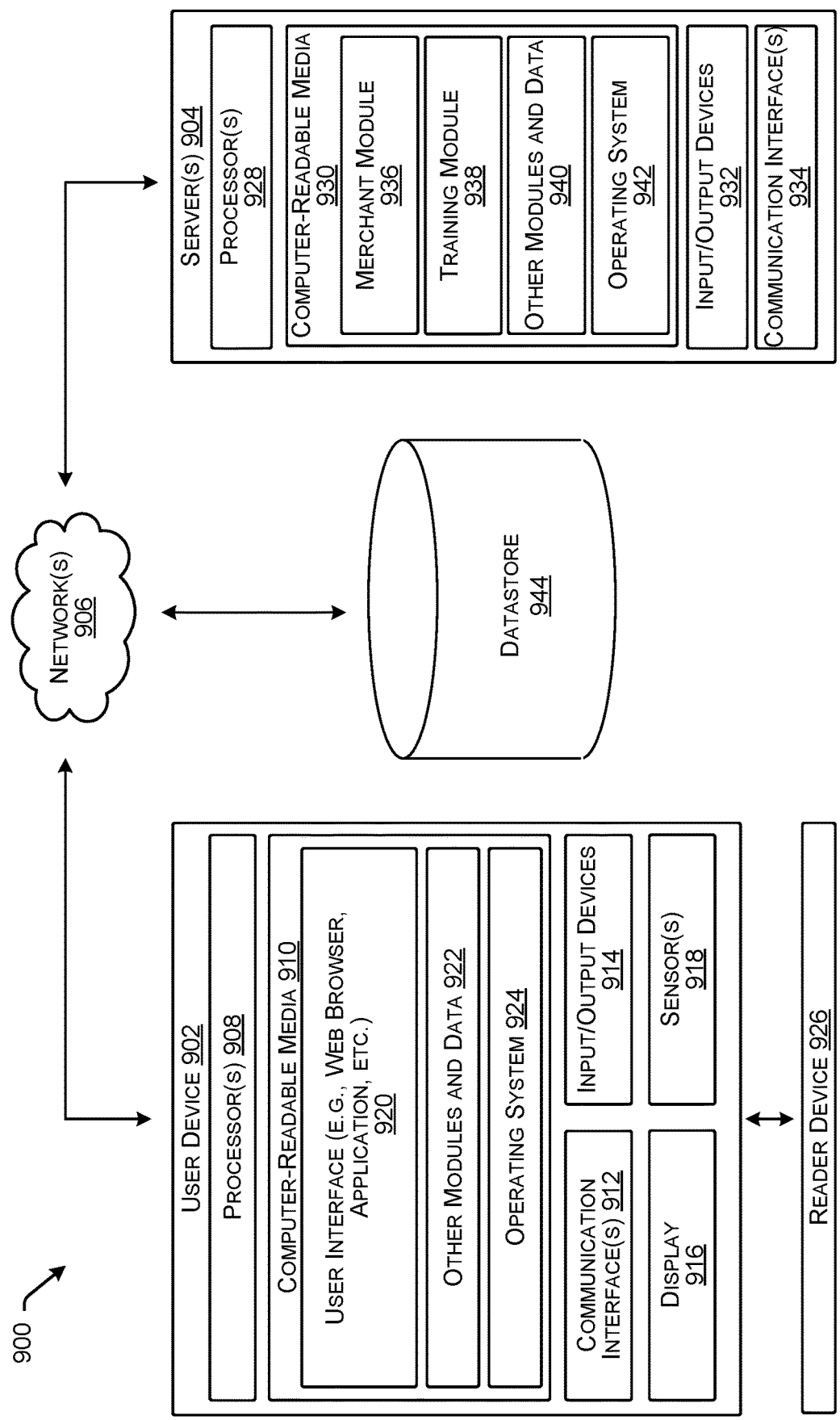
FIG. 9 is an illustrative block diagram illustrating a system for performing techniques described herein.

FIG. 9 is an illustrative block diagram illustrating a system 900 for performing techniques described herein. The system 900 includes a user device 902, that communicates with server computing device(s) (e.g., server(s) 904) via network(s) 906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 902 is illustrated, in additional or alternate examples, the system 900 can have multiple user devices, as described above with reference to FIG. 8. In an example, the user device 902 can correspond to the computing device 100 configured to perform the various acts and/or processes described herein (e.g., to automatically generate fulfillment attributes for an item). Additionally, or alternatively, the server(s) 904 may be configured to perform the various acts and/or processes described herein (e.g., to automatically generate fulfillment attributes for an item). In at least one example, an ecommerce service provider and/or the payment processing service provider 105 described above may operate the server(s) 904 and/or service an application (e.g., the application 106) installed on the user device 902. In an illustrative example, one or more of a user device 902 and/or a server(s) 904 may include logic, such as the application 106 described herein, to automatically generate a shipping quote for shipping an item to a delivery location and causing display of the auto-generated shipping quote. In the example of a user device 902 implementing the techniques described herein, the auto-generated shipping quote may be displayed on the display 916 of the device 902. In the example of a server(s) 904 implementing the techniques described herein, the server(s) 904 may send data to a user device 902 for display of an auto-generated shipping quote on the display 916 of the device 902. The network(s) 804 described above can correspond to the network(s) 906.

In at least one example, the user device 902 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a digital camera, a desktop computing device, a terminal computing device or other semi-stationary or stationary computing device, a dedicated device, a wearable computing device or other body-mounted computing device, an AR device, a virtual reality (VR) device, an Internet of Things (IoT) device, etc. That is, the user device 902 can be any computing device capable of sending communications and performing the functions according to the techniques described herein. The user device 902 can include devices, e.g., payment card readers, or components capable of accepting payments, as described below.

In the illustrated example, the user device 902 includes one or more processors 908, one or more computer-readable media 910, one or more communication interface(s) 912, one or more input/output (I/O) devices 914, a display 916, and sensor(s) 918.

In at least one example, each processor 908 can itself comprise one or more processors or processing cores. For example, the processor(s) 908 can be implemented as one or more microprocessors, microcomputers, microcontrollers, digital signal processors, central processing units, state machines, logic circuitries, and/or any devices that manipulate signals based on operational instructions. In some examples, the processor(s) 908 can be one or more hardware processors and/or logic circuits of any suitable type specifically programmed or configured to execute the algorithms and processes described herein. The processor(s) 908 can be configured to fetch and execute computer-readable processor-executable instructions stored in the computer-readable media 910.

Depending on the configuration of the user device 902, the computer-readable media 910 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 910 can include, but is not limited to, RAM, ROM, EEPROM, flash memory, solid-state storage, magnetic disk storage, optical storage, and/or other computer-readable media technology. Further, in some examples, the user device 902 can access external storage, such as RAID storage systems, storage arrays, network attached storage, storage area networks, cloud storage, or any other medium that can be used to store information and that can be accessed by the processor(s) 908 directly or through another computing device or network. Accordingly, the computer-readable media 910 can be computer storage media able to store instructions, modules or components that can be executed by the processor(s) 908. Further, when mentioned, non-transitory computer-readable media exclude media such as energy, carrier signals, electromagnetic waves, and signals per se.

The computer-readable media 910 can be used to store and maintain any number of functional components that are executable by the processor(s) 908. In some implementations, these functional components comprise instructions or programs that are executable by the processor(s) 908 and that, when executed, implement operational logic for performing the actions and services attributed above to the user device 902. Functional components stored in the computer-readable media 910 can include a user interface 920 to enable users to interact with the user device 902, and thus the server(s) 904 and/or other networked devices. In at least one example, the user interface 920 can be presented via a web browser, or the like. In other examples, the user interface 920 can be presented via an application, such as a mobile application or desktop application, which can be provided by a service provider 812 associated with the server(s) 904, or which can be an otherwise dedicated application. In at least one example, the user interface 920 corresponds to a user interface(s) of the application 106 described herein, such as the user interface(s) 200, 300, 400, 500 described with reference to FIGS. 2-5. In at least one example, a user can interact with the user interface via touch input, spoken input, gesture, or any other type of input. The word "input" is also used to describe "contextual" input that may not be directly provided by the user via the user interface 920. For example, user's interactions with the user interface 920 are analyzed using, e.g., natural language processing techniques, to determine context or intent of the user, which may be treated in a manner similar to "direct" user input.

Depending on the type of the user device 902, the computer-readable media 910 can also optionally include other functional components and data, such as other modules and data 922, which can include programs, drivers, etc., and the data used or generated by the functional components. In addition, the computer-readable media 910 can also store data, data structures and the like, that are used by the functional components. Further, the user device 902 can include many other logical, programmatic and physical components, of which those described are merely examples that are related to the discussion herein.

In at least one example, the computer-readable media 910 can include additional functional components, such as an operating system 924 for controlling and managing various functions of the user device 902 and for enabling basic user interactions.

The communication interface(s) 912 can include one or more interfaces and hardware components for enabling communication with various other devices, such as over the network(s) 906 or directly. For example, communication interface(s) 912 can enable communication through one or more network(s) 906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 902 can further include one or more input/output (I/O) devices 914. The I/O devices 914 can include speakers, a microphone, a camera (e.g., a camera 113), and various user controls (e.g., buttons, a joystick, a keyboard, a keypad, etc.), a haptic output device, and so forth. The I/O devices 914 can also include attachments that leverage the accessories (audio-jack, USB-C, Bluetooth, etc.) to connect with the user device 902.

In at least one example, user device 902 can include a display 916. Depending on the type of computing device(s) used as the user device 902, the display 916 can employ any suitable display technology. For example, the display 916 can be a liquid crystal display, a plasma display, a light emitting diode display, an OLED (organic light-emitting diode) display, an electronic paper display, or any other suitable type of display able to present digital content thereon. In at least one example, the display 916 can be an augmented reality display, a virtually reality display, or any other display able to present and/or project digital content. In some examples, the display 916 can have a touch sensor associated with the display 916 to provide a touchscreen display configured to receive touch inputs for enabling interaction with a graphic interface presented on the display 916. Accordingly, implementations herein are not limited to any particular display technology. Alternatively, in some examples, the user device 902 may not include the display 916, and information can be presented by other means, such as aurally, haptically, etc.

In addition, the user device 902 can include sensor(s) 918. The sensor(s) 918 can include a GPS device able to indicate location information. Further, the sensor(s) 918 can include, but are not limited to, an accelerometer, gyroscope, compass, proximity sensor, camera, microphone, and/or a switch.

Additionally, the user device 902 can include various other components that are not shown, examples of which include removable storage, a power source, such as a battery and power control unit, a barcode scanner, a printer, a cash drawer, and so forth.

In addition, in some examples, the user device 902 can include, be connectable to, or otherwise be coupled to a reader device 926, for reading payment instruments and/or identifiers associated with payment objects. In some examples, as described above, the reader device 926 can plug in to a port in the user device 902, such as a microphone port, a headphone port, an audio-jack, a data port, or other suitable port. In additional or alternative examples, the reader device 926 can be coupled to the user device 902 via another wired or wireless connection, such as via a Bluetooth®, BLE, and so on. The reader device 926 can include a read head for reading a magnetic strip of a payment card, and further can include encryption technology for encrypting the information read from the magnetic strip. Additionally or alternatively, the reader device 926 can be an EMV payment reader, which in some examples, can be embedded in the user device 902. Moreover, numerous other types of readers can be employed with the user device 902 herein, depending on the type and configuration of the user device 902.

The reader device 926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 926 may include hardware implementation, such as slots, magnetic tracks, and rails with one or more sensors or electrical contacts to facilitate detection and acceptance of a payment instrument. That is, the reader device 926 may include hardware implementations to enable the reader device 926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 926 may also include a biometric sensor to receive and process biometric characteristics and process them as payment instruments, given that such biometric characteristics are registered with the payment service provider's system and connected to a financial account with a bank server.

The reader device 926 may include processing unit(s), computer-readable media, a reader chip, a transaction chip, a timer, a clock, a network interface, a power supply, and so on. The processing unit(s) of the reader device 926 may execute one or more modules and/or processes to cause the reader device 926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 926, the computer-readable media may include volatile memory (such as RAM), non-volatile memory (such as ROM, flash memory, miniature hard drive, memory card, or the like), or some combination thereof. In at least one example, the computer-readable media of the reader device 926 may include at least one module for performing various functions as described herein.

The reader chip may perform functionalities to control the operations and processing of the reader device 926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control a clock, which may provide a clock signal indicating a time. Furthermore, the reader chip may perform functionality to control the network interface, which may interface with the network(s) 906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS device, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 902, which can be a POS device, and the reader device 926 are shown as separate devices, in additional or alternative examples, the user device 902 and the reader device 926 can be part of a single device, which may be a battery-operated device. In such an example, components of both the user device 902 and the reader device 926 may be associated with the single device. In some examples, the reader device 926 can have a display integrated therewith, which can be in addition to (or as an alternative of) the display 916 associated with the user device 902.

The server(s) 904 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used. In at least one example, the server(s) 904 is configured to perform the various acts and/or processes described herein, such as the process 600 and/or the process 700.

Further, while the figures illustrate the components and data of the server(s) 904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 904 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 904 can include one or more processors 928, one or more computer-readable media 930, one or more I/O devices 932, and one or more communication interfaces 934. Each processor 928 can be a single processing unit or a number of processing units, and can include single or multiple computing units or multiple processing cores. The processor(s) 928 can be implemented as one or more microprocessors, microcomputers, microcontrollers, digital signal processors, central processing units, state machines, logic circuitries, and/or any devices that manipulate signals based on operational instructions. For example, the processor(s) 928 can be one or more hardware processors and/or logic circuits of any suitable type specifically programmed or configured to execute the algorithms and processes described herein. The processor(s) 928 can be configured to fetch and execute computer-readable instructions stored in the computer-readable media 930, which can program the processor(s) 928 to perform the functions described herein.

The computer-readable media 930 can include volatile and nonvolatile memory and/or removable and non-removable media implemented in any type of technology for storage of information, such as computer-readable instructions, data structures, program modules, or other data. Such computer-readable media 930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 904, the computer-readable media 930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 930 can be used to store any number of functional components that are executable by the processor(s) 928. In many implementations, these functional components comprise instructions or programs that are executable by the processors 928 and that, when executed, specifically configure the one or more processors 928 to perform the actions attributed above to the service provider 812 and/or payment processing service. Functional components stored in the computer-readable media 930 can optionally include a merchant module 936, a training module 938, and one or more other modules and data 940.

The merchant module 936 can be configured to receive transaction data from POS systems, such as the POS system 824 described above with reference to FIG. 8. The merchant module 936 can transmit requests (e.g., authorization, capture, settlement, etc.) to payment service server computing device(s) to facilitate POS transactions between merchants and customers. The merchant module 936 can communicate the successes or failures of the POS transactions to the POS systems. In some examples, a payment processing module and the merchant module 936 can perform the same or similar functions.

The training module 938 can be configured to train models using machine-learning mechanisms. For example, the machine learning model(s) 310 described herein may be trained to classify an image(s) 308 of an item 302 for purposes of determining characteristics of the item 302, as described in detail herein. In some examples, could a machine learning process may continually refine the accuracy of the image analysis and the DIM weight 110 calculations described herein to generate more accurate fulfillment attributes (e.g., shipping quotes). For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 902 and/or the server(s) 904 for use at a time after the data models have been trained (e.g., at runtime).

The one or more other modules and data 940 can include programs, drivers, etc., and the data used or generated by the functional components. Further, the server(s) 904 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 930 can additionally include an operating system 942 for controlling and managing various functions of the server(s) 904. The communication interface(s) 934 can include one or more interfaces and hardware components for enabling communication with various other devices, such as over the network(s) 906 or directly. For example, communication interface(s) 934 can enable communication through one or more network(s) 906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 904 can further be equipped with various I/O devices 932. Such I/O devices 932 can include a display, various user interface controls (e.g., buttons, joystick, keyboard, mouse, touch screen, biometric or sensory input devices, etc.), audio speakers, connection ports and so forth.

In at least one example, the system 900 can include a datastore 944 that can be configured to store data that is accessible, manageable, and updatable. In some examples, the datastore 944 can be integrated with the user device 902 and/or the server(s) 904. In other examples, as shown in FIG. 9, the datastore 944 can be located remotely from the server(s) 904 and can be accessible to the server(s) 904. The datastore 944 can comprise multiple databases and/or servers connected locally and/or remotely via the network(s) 906. In at least one example, the datastore 944 can store user profiles, which can include merchant profiles, customer profiles, courier profiles, and so on, as described above.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 812.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc. In at least one example, an account(s) can include or be associated with the merchant profiles and/or customer profiles described above.

Furthermore, in at least one example, the datastore 944 can store inventory database(s) and/or catalog database(s). As described above, an inventory can store data associated with a quantity of each item that a merchant has available to the merchant. Furthermore, a catalog can store data associated with items that a merchant has available for acquisition. The datastore 944 can store additional or alternative types of data (e.g., image(s), etc.) as described herein.

In at least one example, the datastore 944 can be associated with a brand asset database, which can store information associated with brand assets associated with merchants. A brand asset can be a logo (e.g., text logo, graphic logo, favicon, etc.), a font, a color, an image, an icon, a button style, effects, spacing, and the like used in association with a brand of the merchant. In some examples, a brand asset can be associated with multiple content items, which can be applicable to different end users and/or intended viewers. For instance, a brand asset corresponding to a logo can be associated with a logo that is presented to customers and a logo that is presented to merchants. In some examples, image(s) captured via techniques described herein can be added to the brand asset database and/or data associated with the brand asset database can be used for informing guidance as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS device, web applications, mobile applications, POS topologies, payment cards, computer networks, and environments.

Various techniques described herein refer to "requests" and/or "prompts." For the purpose of this discussion, a "request" or a "prompt" can be a data item transmitted between computing devices described herein with instructions for performing and/or taking an action (e.g., a "request") and/or a recommendation for performing and/or taking an action (e.g., a "prompt"). In some examples, the "requests" and/or "prompts" can be associated with graphical user interface (GUI) elements that are to be presented via a user interface to communicate the instructions to a user of a respective user device.

Various figures included herein are flowcharts showing example methods involving techniques as described herein. The methods illustrated are described with reference to FIGS. 5 and 6 for convenience and ease of understanding. However, the methods illustrated are not limited to being performed using components described in FIGS. 1-5, 8, and 9, and such components are not limited to performing the methods illustrated herein. In accordance with various embodiments described herein, the terms "computing device," "user equipment (UE)," "user device," "merchant device," "seller device," "point-of-sale (POS) device," "wireless communication device," "wireless device," "communication device," "mobile device," "handheld device," "client device," "electronic device," "device," and "system" may be used interchangeably herein to describe any computing device(s) that is/are capable of performing the various acts and/or processes disclosed herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A method for automatically generating a shipping quote for an object, the method comprising:
    executing an application by a processor of a point-of-sale (POS) device;
    receiving an image or a video of the object captured by a camera of the POS device;
    determining, by the processor, based on an analysis of the image or the video, whether the object has a cuboidal shape;
    based on determining that the object has the cuboidal shape:
        determining, by the processor, that the object is a packaged item;
        presenting, on a display of the POS device, a first selectable element to confirm that the packaged item is already packaged;
        receiving, via the application, first user input selecting the first selectable element;
        presenting, on the display of the POS device, and based on the image or the video, a live, pass-through video feed within a viewport of a user interface of the application;
        receiving, via the application, second user input at three or more locations within the viewport, each location respectively indicating a corner of the packaged item as represented in the image or the video;
        determining, by the processor, and using an augmented reality (AR) component to convert the second user input received at the three or more locations into coordinates representing a boundary of the packaged item, dimensions of the packaged item, the dimensions comprising a length, a width, and a height; and
storing, by the processor, in memory of the POS device, the dimensions as structured data;
calculating, by the processor, and based on the dimensions stored as the structured data and a dimensional factor specific to a fulfillment provider, a dimensional weight of the packaged item;
receiving, based on third user input received via the application, weight data from a scale via a wireless transceiver of the POS device, the weight data indicating an actual weight of the packaged item;
receiving, via the application, fourth user input that specifies a delivery location where the packaged item is to be shipped;
calculating, by the processor, and based on the delivery location and a greater of the dimensional weight and the actual weight, a cost of shipping the packaged item to the delivery location using a delivery service of the fulfillment provider;
presenting, on the display of the POS device, a second selectable element indicating the cost; and
selecting, by the processor, during a checkout process for the packaged item, the delivery service for shipping the packaged item to the delivery location based on a selection of the second selectable element.

2. The method of claim 1, wherein the packaged item is a first packaged item, the dimensions are first dimensions, the analysis of the image or the video is a first analysis of a first image or a first video, the actual weight is a first actual weight, and the method further comprises:
receiving a second image or a second video of a second packaged item;
determining a second actual weight associated with the second packaged item; and
determining second dimensions of the second packaged item, wherein the calculating of the dimensional weight comprises calculating the dimensional weight of the first packaged item and the second packaged item bundled in a package based on the first dimensions, the second dimensions, and the dimensional factor, and
wherein the calculating of the cost comprises calculating the cost of shipping the first packaged item and the second packaged item to the delivery location based on a greater of the dimensional weight and a sum of the first actual weight and the second actual weight.

3. The method of claim 1, further comprising, prior to the determining of the dimensions, determining, based at least in part on the analysis of the image or the video, that the image or the video is devoid of a machine-readable code.

4. The method of claim 1, wherein the presenting of the first selectable element on the display of the POS device to confirm that the packaged item is already packaged is based on the determining that the object has the cuboidal shape with a level of confidence that is less than a threshold confidence level.

5. A system comprising:
a camera;
a display;
one or more processors; and
memory storing computer-executable instructions that, when executed by the one or more processors, cause the one or more processors to perform operations comprising:
receiving an image or a video of an object captured by the camera;
determining, based at least in part on an analysis of the image or the video, whether the object has a cuboidal shape;
based at least in part on determining that the object has the cuboidal shape:
determining that the object is a packaged item;
causing presentation, on the display, of a first selectable element to confirm that the packaged item is already packaged;
receiving, via an application, first user input selecting the first selectable element;
causing presentation, on the display, and based on the image or the video, of a live, pass-through video feed within a viewport of a user interface of the application;
receiving, via the application, second user input at three or more locations within the viewport, each location respectively indicating a corner of the packaged item as represented in the image or the video;
determining, using an augmented reality (AR) component to convert the second user input received at the three or more locations into coordinates representing a boundary of the packaged item, dimensions of the packaged item; and
storing, in the memory, the dimensions as structured data;
receiving, via the application, third user input that specifies a delivery location where the packaged item is to be shipped;
determining, based at least in part on the delivery location and the dimensions, one or more fulfillment attributes including one of a quote for fulfilling delivery of the packaged item, a fulfillment channel, a fulfillment container, a type of packaging material, or one or more bundling options to fulfill the delivery of the packaged item;
causing presentation of a second selectable element indicating the one or more fulfillment attributes on the display; and
completing a step of a checkout process for the packaged item based at least in part on a selection of the second selectable element.

6. The system of claim 5, wherein the operations further comprise receiving weight data obtained using a scale, the weight data indicating an actual weight associated with the packaged item, and wherein the determining of the one or more fulfillment attributes is further based on the actual weight.

7. The system of claim 5, wherein the operations further comprise determining a dimensional weight associated with the packaged item based at least in part on the dimensions, and wherein the determining of the one or more fulfillment attributes is further based on the dimensional weight.

8. The system of claim 5, wherein the packaged item is a first packaged item, the analysis of the image or the video is a first analysis of a first image or a first video, the dimensions are first dimensions, and the operations further comprise:
receiving a second image or a second video of a second packaged item;
determining, using the AR component, and based at least in part on a second analysis of the second image or the second video, second dimensions of a second package containing the second packaged item; and
determining a dimensional weight associated with the first packaged item and the second packaged item based at least in part on the first dimensions, the second dimensions, and a dimensional factor specific to a fulfillment provider, wherein the determining of the one or more fulfillment attributes is further based on the dimensional weight.

9. The system of claim 5, wherein the operations further comprise, prior to the determining of the dimensions, determining, based at least in part on the analysis of the image or the video, that the image or the video is devoid of a machine-readable code.

10. The system of claim 5, wherein the analysis of the image or the video is a first analysis of a first image or a first video, the dimensions are first dimensions, and the operations further comprise:
receiving a second image or a second video of an unpackaged item different than the packaged item;
detecting a machine-readable code based at least in part on a second analysis of the second image or the second video;
determining an identifier of the unpackaged item based at least in part on the machine-readable code;
determining, by accessing a database using the identifier of the unpackaged item, second dimensions of a second package that is to be used to deliver the unpackaged item; and
determining a dimensional weight associated with the packaged item and the unpackaged item based at least in part on the first dimensions, the second dimensions, and a dimensional factor specific to a fulfillment provider, wherein the determining of the one or more fulfillment attributes is further based on the dimensional weight.

11. The system of claim 5, wherein the quote is a first quote, wherein the one or more fulfillment attributes include the first quote, and wherein the operations further comprise:
determining, based at least in part on the delivery location and the dimensions, a second quote for fulfilling the delivery of the packaged item; and
causing presentation of a third selectable element indicating the second quote on the display.

12. The system of claim 5, wherein the causing of the presentation of the first selectable element on the display to confirm that the packaged item is already packaged is based at least in part on the determining that the object has the cuboidal shape with a level of confidence that is less than a threshold confidence level.

13. A method comprising:
receiving, by a processor, an image or a video of an object captured by a camera;
determining, by the processor, and based at least in part on an analysis of the image or the video, whether the object has a cuboidal shape;
based at least in part on determining that the object has the cuboidal shape:
determining, by the processor, that the object is a packaged item;
causing, by the processor, presentation, on a display, of a first selectable element to confirm that the packaged item is already packaged;
receiving, via an application, first user input selecting the first selectable element;
causing, by the processor, and based on the image or the video, presentation, on the display, of a live, pass-through video feed within a viewport of a user interface of the application;
receiving, via the application, second user input at three or more locations within the viewport, each location respectively indicating a corner of the packaged item as represented in the image or the video;
determining, by the processor, and using an augmented reality (AR) component to convert the second user input received at the three or more locations into coordinates representing a boundary of the packaged item, dimensions of the packaged item; and
storing, by the processor, in memory, the dimensions as structured data;
receiving, via the application, third user input that specifies a delivery location where the packaged item is to be shipped;
determining, by the processor, and based at least in part on the delivery location and the dimensions, a fulfillment attribute including one of a quote for fulfilling delivery of the packaged item, a fulfillment channel, a fulfillment container, a type of packaging material, or one or more bundling options to fulfill the delivery of the packaged item;
causing, by the processor, presentation of a second selectable element indicating the fulfillment attribute on the display; and
completing, by the processor, a step of a checkout process for the packaged item based at least in part on a selection of the second selectable element.

14. The method of claim 13, further comprising receiving weight data obtained using a scale, the weight data indicating an actual weight associated with the packaged item, and wherein the determining of the fulfillment attribute is further based on the actual weight.

15. The method of claim 13, wherein the packaged item is a first packaged item, the analysis of the image or the video is a first analysis of a first image or a first video, the dimensions are first dimensions, and the method further comprises:
receiving a second image or a second video of a second packaged item;
determining, using the AR component, and based at least in part on a second analysis of the second image or the second video, second dimensions of a second package containing the second packaged item; and
determining a dimensional weight associated with the first packaged item and the second packaged item based at least in part on the first dimensions, the second dimensions, and a dimensional factor specific to a fulfillment provider, wherein the determining of the fulfillment attribute is further based on the dimensional weight.

16. The method of claim 13, wherein the analysis of the image or the video is a first analysis of a first image or a first video, the dimensions are first dimensions, and the method further comprises:
receiving a second image or a second video of an unpackaged item;
detecting a machine-readable code based at least in part on a second analysis of the second image or the second video;
determining an identifier of the unpackaged item based at least in part on the machine-readable code;
determining, by accessing a database using the identifier of the unpackaged item, second dimensions of a second package that is to be used to deliver the unpackaged item; and
determining a dimensional weight associated with the packaged item and the unpackaged item based at least in part on the first dimensions, the second dimensions, and a dimensional factor specific to a fulfillment provider, wherein the determining of the fulfillment attribute is further based on the dimensional weight.

17. The method of claim 13, further comprising:
determining a difference between a price of the packaged item and a purchase price to obtain free shipping, the price of the packaged item being less than the purchase price to obtain the free shipping; and
causing presentation, on the display, of a recommendation to purchase a second item at a second price that is equal to or greater than the difference in order to obtain the free shipping.

18. The method of claim 13, further comprising, prior to the determining of the dimensions, determining, based at least in part on the analysis of the image or the video, that the image or the video is devoid of a machine-readable code.

19. The method of claim 13, wherein the processor is a component of a point-of-sale (POS) device.

20. The method of claim 13, wherein the causing of the presentation of the first selectable element on the display to confirm that the packaged item is already packaged is based at least in part on the determining that the object has the cuboidal shape with a level of confidence that is less than a threshold confidence level.

* * * * *